US00RE40813E

(19) United States
(12) Reissued Patent
McCullough et al.

(10) Patent Number: US RE40,813 E
(45) Date of Reissued Patent: Jun. 30, 2009

(54) POLYTHIOPHENES, BLOCK COPOLYMERS MADE THEREFROM, AND METHODS OF FORMING THE SAME

(75) Inventors: Richard D. McCullough, Allison Park, PA (US); Jinsong Liu, Pittsburgh, PA (US); Paul C. Ewbank, Norristown, PA (US); Elena E. Sheina, Pittsburgh, PA (US)

(73) Assignee: Carnegie Mellon University, Pittsburgh, PA (US)

(21) Appl. No.: 11/197,727

(22) Filed: Aug. 4, 2005

Related U.S. Patent Documents

Reissue of:
(64) Patent No.: 6,602,974
Issued: Aug. 5, 2003
Appl. No.: 10/004,782
Filed: Dec. 4, 2001

(51) Int. Cl.
*C08G 18/64* (2006.01)

(52) U.S. Cl. ..... 528/73; 528/377; 528/378; 528/379; 525/536; 525/417; 525/535

(58) Field of Classification Search ..... 528/73, 528/377, 378, 379; 525/536, 417, 535
See application file for complete search history.

(56) References Cited

U.S. PATENT DOCUMENTS

| | | | |
|---|---|---|---|
| 4,508,639 | A | 4/1985 | Camps et al. |
| 4,521,589 | A | 6/1985 | Yamamoto et al. |
| 4,711,742 | A | 12/1987 | Jen et al. |
| 4,737,557 | A | 4/1988 | Sato et al. |
| 4,929,388 | A | 5/1990 | Wessling |
| 4,935,164 | A | 6/1990 | Wessling et al. |
| 5,028,354 | A | 7/1991 | Smith et al. |
| 5,185,100 | A | 2/1993 | Han et al. |
| 5,217,649 | A | 6/1993 | Kulkarni et al. |
| 5,227,092 | A | 7/1993 | Han |
| 5,281,363 | A | 1/1994 | Shacklette et al. |
| 5,358,546 | A | 10/1994 | Rieke |
| 5,391,622 | A | 2/1995 | Ho et al. |
| 5,427,855 | A | 6/1995 | Heeger et al. |
| 5,476,612 | A | 12/1995 | Wessling et al. |
| 5,571,454 | A | 11/1996 | Chen et al. |
| 5,756,653 | A | 5/1998 | Rieke |
| 5,965,241 | A | 10/1999 | Mehta |
| 6,025,462 | A | 2/2000 | Wang et al. |
| 6,166,172 | A | 12/2000 | McCullough et al. |
| 6,190,846 | B1 | 2/2001 | Majumdar et al. |
| 6,887,965 | B2 | 5/2005 | McCullough et al. |
| 2004/0051084 | A1 | 3/2004 | Wessling |
| 2005/0187130 | A1 | 8/2005 | McCullough et al. |

OTHER PUBLICATIONS

McCullough, "The Chemistry of Conducting Polythiophenes", *Advanced Materials*, vol. 10, No. 2, pp. 93–116 (1999).

Guillerez et al., "New Convenient Synthesis of Highly Regloregular Poly (3–octylthiophene) Based on the Suzuki Coupling Reaction", *Synthetic Metals*, vol. 93 pp. 123–126 (1998).

(Continued)

*Primary Examiner*—Duc Truong
(74) *Attorney, Agent, or Firm*—K&L Gates LLP

(57) ABSTRACT

The present invention relates to polythiophenes, particularly regioregular head-to-tail poly(3-alkylthiophenes) (HT-PATs), block copolymers made therefrom, and their methods of formation. The present invention provides HT-PATs with well-defined, specific end-groups, functionalization of the defined HT-PATs, and incorporation of end group functionalized HT-PATs into block copolymers with structural polymers. The intrinsically conductive diblock and triblock copolymers, formed from the HT-PATs, have excellent conductivity and low polydispersities that are useful in a number of applications. The block copolymers of the present invention have been found to exhibit conductivities that range from a low of $10^{-8}$ S/cm for certain applications to as high as several hundred S/cm or more.

86 Claims, 6 Drawing Sheets

OTHER PUBLICATIONS

Iraqi et al. "Synthesis and Characterisation of Telechelic Regioregular Head–to–Tail Poly (3–Alkythiophenes)", *Mater. Chem.*, vol. 8, No. 1, pp. 25–29 (1998).
Shirakawa et al., "Cross–Coupling Reaction of Organostannanes with Aryl Halides Catalyzed by Nickel–Tripenylphosphine or Nickel–Lithium Halide Complex", *Synthesis*, pp. 1544–1549 (Oct. 1998).
Boymond et al., "Preparation of Highly Functionalized Grignard Reagents by an Iodine–Magnesium Exchange Reaction and its Application in Solid–Phase Synthesis", *Angew. Chem. Int. Ed.*, vol. 37, No. 12, pp. 1701–1803 (1998).
Bao et al., "Soluble and Processable Regioregular Poly (3–hexylthiophene) for Thin Film Field–Effect Transistor Applications with High Mobility", *Appl. Phys. Lett.*, vol. 69 (26), pp. 4108–4110 (1995).
Chen et al., "Regiocontrolled Synthesis of Poly(3–alkylthiophenes) Mediated by Rieke Zinc: Their Characterization and Solid–State Properties", *J. Am. Chem. Soc.*, vol. 117, pp. 233–244 (1995).
Mao et al, "Synthesis and Structure–Property Relationships of Regioirregular Poly(3–hexythiophenes)", *Macromolecules*, vol. 26, pp. 1163–1169 (1993).
McCullough et al., "Design, Synthesis, and Control of Conducting Polymer Architectures: Structually Homogeneous Poly(3–alkylthiophenes)", *J. Org. Chem.*, vol. 58, pp. 904–912 (1993).
Farina et al., "Palladium–Catalyzed Coupling of Aryistannes with Organic Sulfonates: A Comprehensive Study", *J. Org. Chem.*, vol. 58, pp. 5434–5444 (1993).
Yamamoto et al.,"Preparation of π–Conjugated Poly(thiophene–2–5–diyl), Pol(ρ–phenylene), and Related Polymers Using Zerovalent Nickel Complexes. Linear Structure and Properties of the π–Conjugated Polymers", *Macromolecules*, vol. 25, pp. 1214–1223 (1992).
Liu et al., "Employing MALDI–MS on Poly-(alkythiophenes): Analysis of Molecular Weights, Molecular Weight Distributions, End–Group Structures, and End–Group Modifications", *Macromolecules*, vol. 32, pp. 5777–5785 (1999).
Liu et al., "End Group Modification of Regioregular Polythiophene through Postpolymerization Functionization," *Macromolecules*, 2002, 35, 9882–9889.
Liu et al., "Tuning the Electrical Conductivity and Self–Assembly of Regioregular Polythiophene by Block Copolymerization: Nanowire Morphologies in New Di–and Triblock Copolymers, " *Angew. Chem. Int. Ed.*, 2002, 41, No. 2, pp. 329–332.
Liu et al., "End Group Functionalization of Regioregular Head–to–Tail Poly(3–alkylthiophenes), " *Polymer Preprints*, 2000, 41(2), 1235–1236.
Liu et al., "ATRP approach to synthesize well–defined diblock copolymers containing regioregular head–to–tail poly(3–hexylthiophene)s," *Polymeric Materials: Science and Engineering*, 2001, 84, 662–663.
Langeveld–Voss et al., "End–Group Modification of Regloregular Poly(3–alkythiophene)s," *Chem. Commun.*, 2000, 81–82.
Francois et al., "Block–Copolymers with Conjugated Segments: Synthesis and Structural Characterization," *Synthetic Metals*, 69, 1995, 463–466.
Yang et al., "A Soluble Blue–Light Emitting Polymer," *Macromolecules*, 1993, 26, 1188–1190.
Widawski et al., "Self–Organized Honeycomb Morphology of Star–Polymer Polystyrene Films," *Nature*, vol. 369, Jun. 2, 1994, 387–389.
Jenekhe et al., "Self–Aggregates of Rod–Coil Block Copolymers and Their Solubilization and Encapsulation of Fullerenes, " *Science*, vol. 279, Mar. 20, 1998, 1903–1907.
Wang et al., "Synthesis of Amphiphilic Diblock Copolymers Containing a Conjugated Block and Their Self–Assembling Properties," *J. Am. Chem. Soc.*, 2000, 122, 6855–6861.
Li et al., "Synthesis of Oligophenylenevinylenes–Polyisoprene Diblock Copolymers and Their Microphase Separation," *Macromolecules*, 1999, 32, 3034–3044.
Hemphenius et al., "A Polystrene–Oligothiophene–Polystyrene Triblock Copolymer," *J. Am. Chem., Soc.*, 1998, 120, 2798–2804.
Greve et al., "Synthesis and Characterisation of Novel Regioregular Polythiophenes—Tuning the Redox Properties," *Eur. J. Org. Chem.*, 2001 3437–3443.
McCullough, "End–group functionalization of regioregular head–to–tail poly(3–alkylthiophenes)," *polymer Preprints*, vol. 41(2), pp. 1235–1236 (2000).
Alkan et al., "Synthesis and Characterization of Conducting Block Copolymers of Thiophene–ended Polystrene with Polyprrole", *Synthetic Metals*, vol. 119 (1–3), pp. 133–134 (2001) (abstract only).

FIG. 1 MALDI MS reveals the incorporation of -OH functional group on one end of HT-PHT
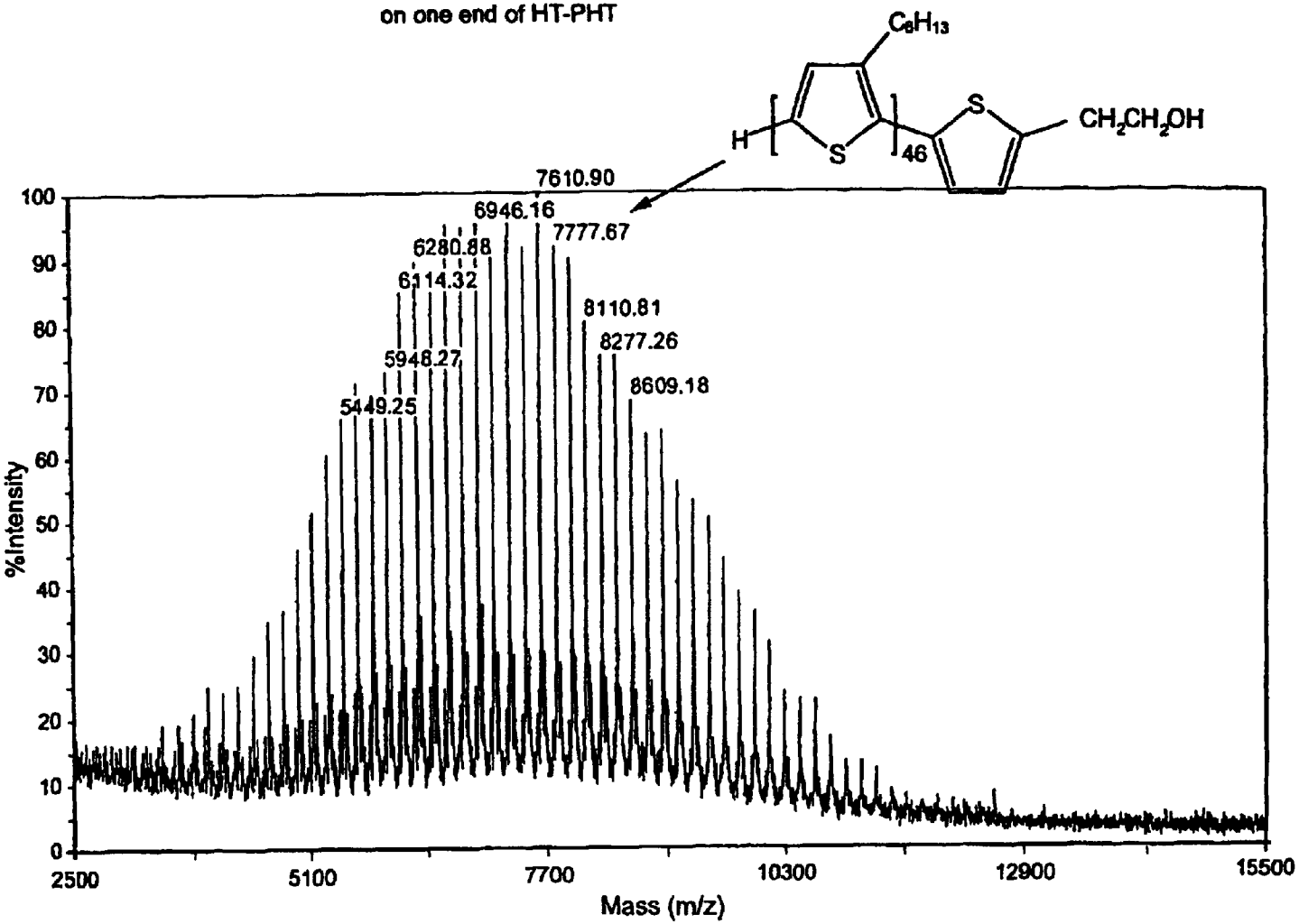

FIG. 2 NMR confirms the incorporation of the-OH functional group on one end of HT-PHT
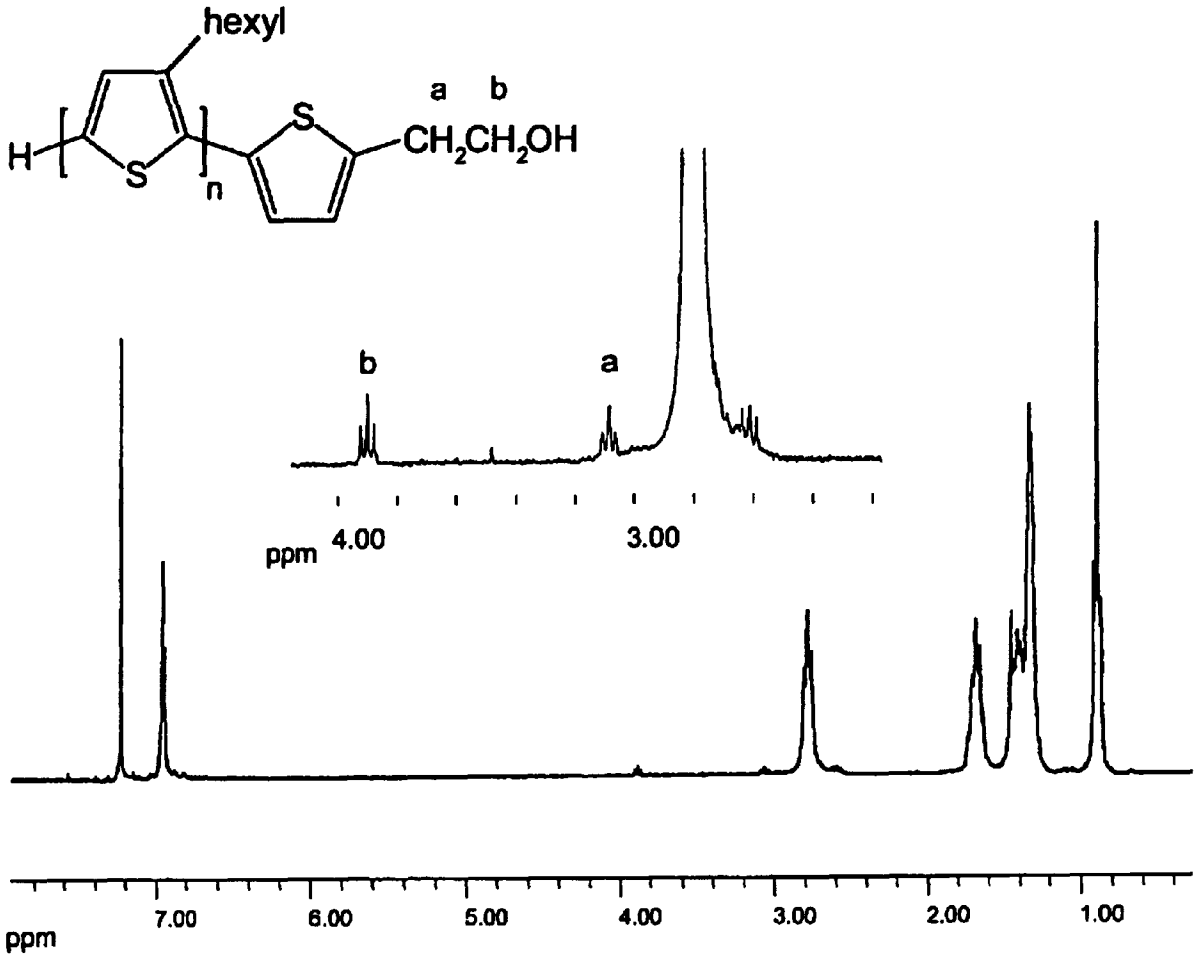

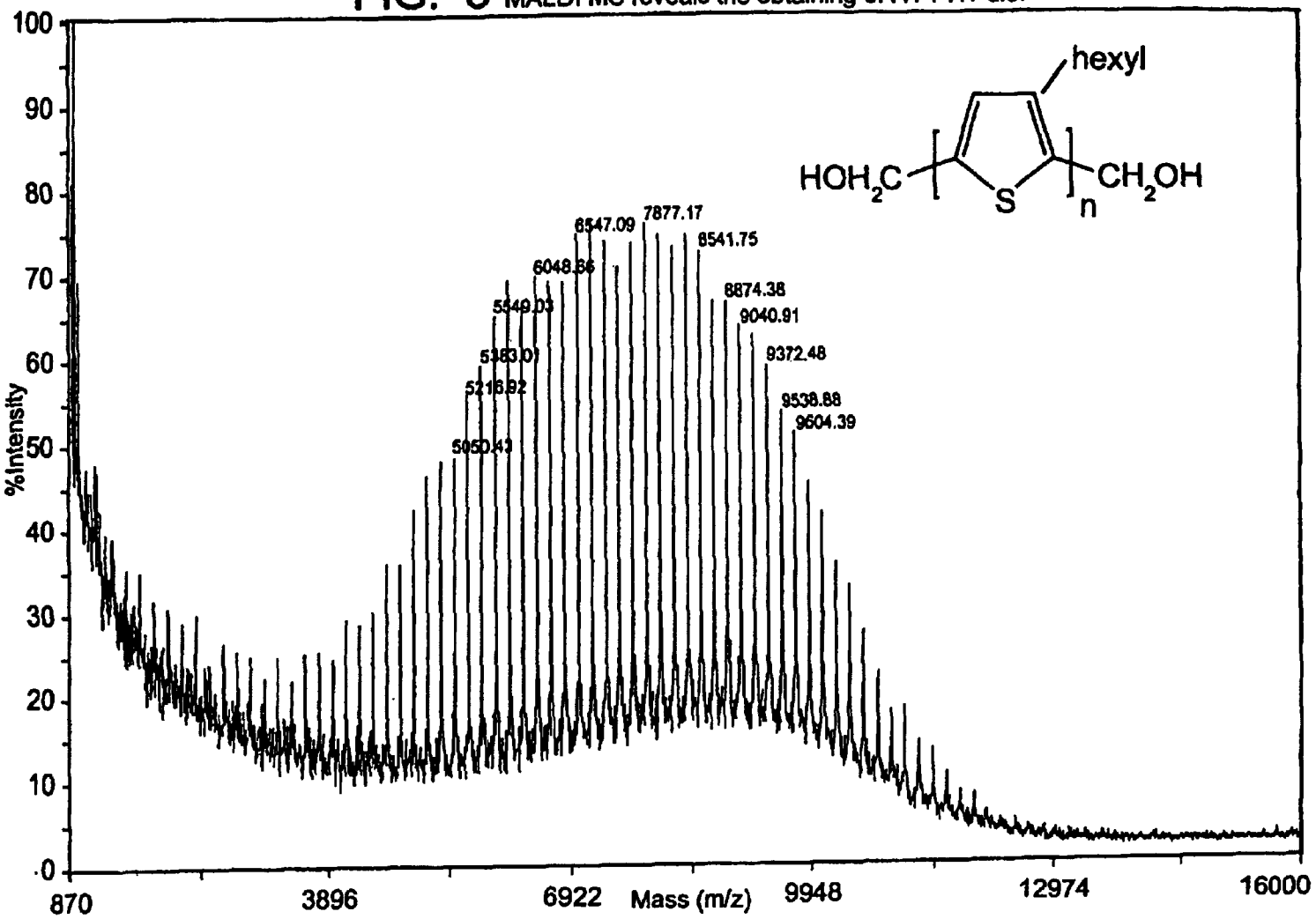
FIG. 3 MALDI MS reveals the obtaining of HT-PHT diol

FIG. 4 AFM reveals the present of "nano-wire" network in the solid films of a HT-PHT-block-PS diblock copolymer
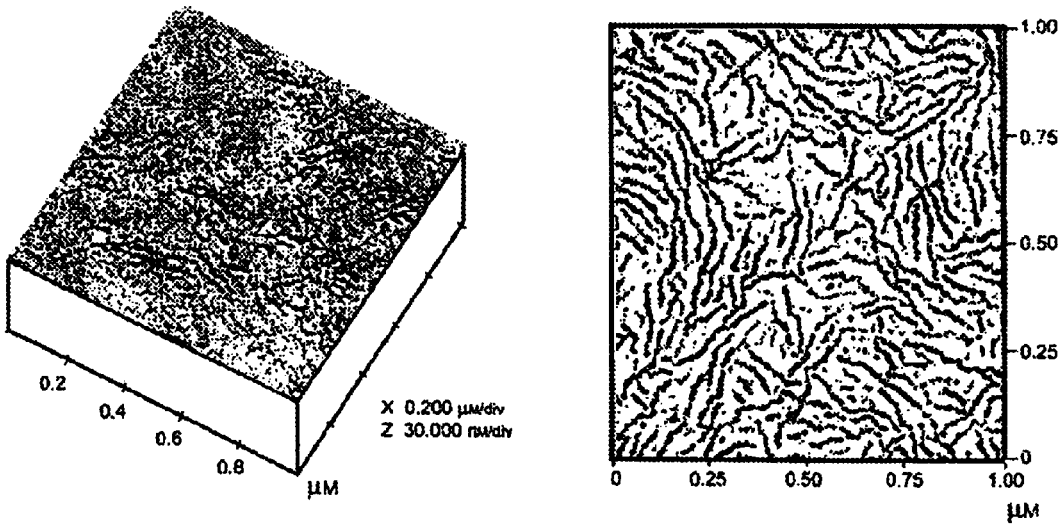

FIG. 5 AFM reveals the present of "nano-wire" network in the solid film of a HT-PHT-block-PMA diblock copolymer
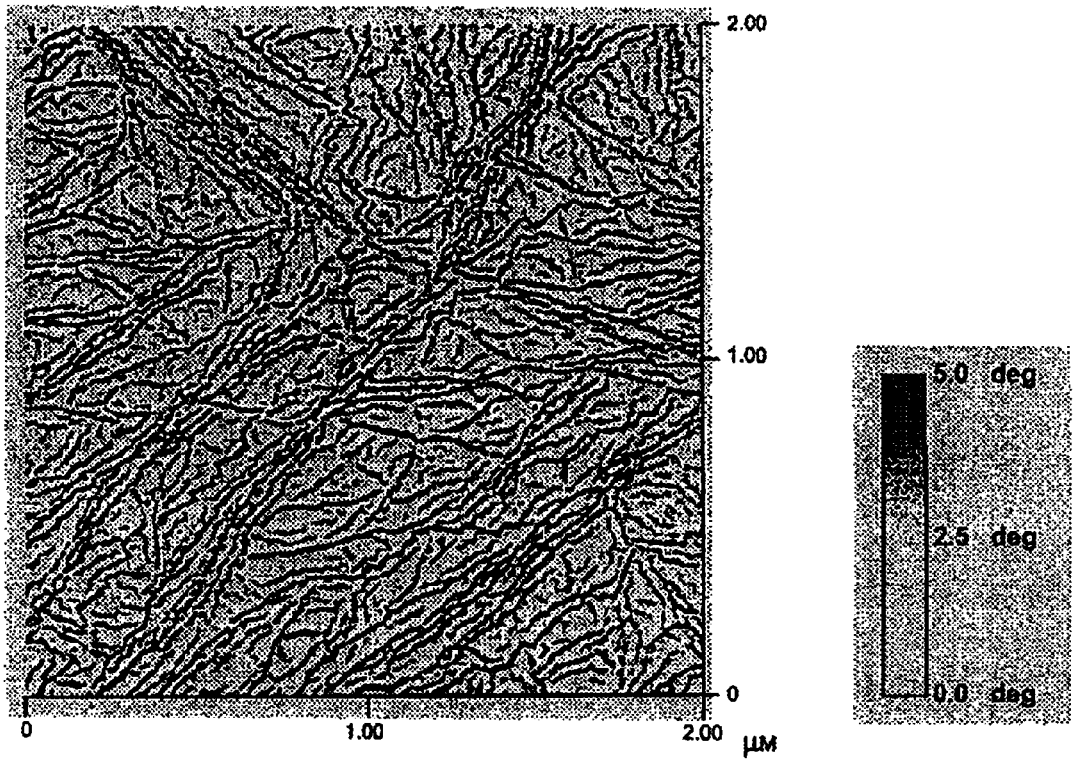

FIG. 6 TEM confirms the present of "nano-wire" network in the solid film of a HT-PHT-block-PMA diblock copolymer
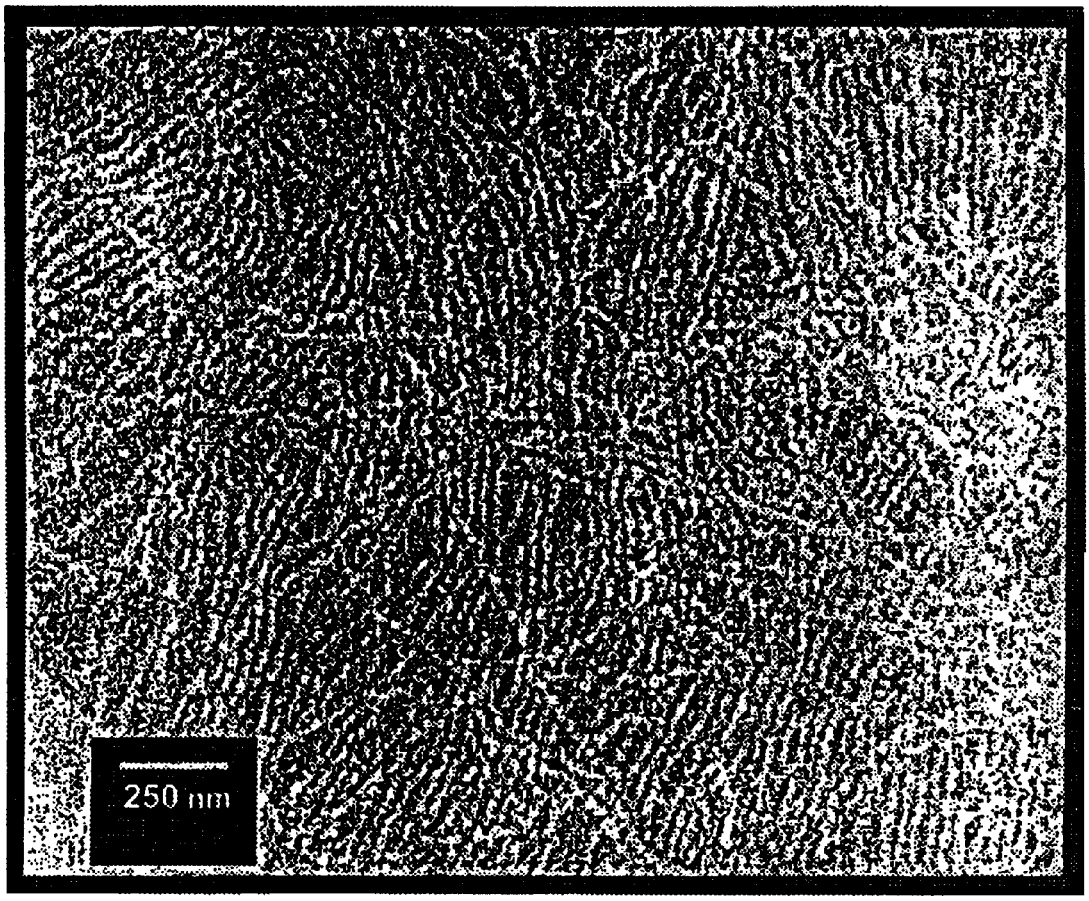

POLYTHIOPHENES, BLOCK COPOLYMERS MADE THEREFROM, AND METHODS OF FORMING THE SAME

Matter enclosed in heavy brackets [ ] appears in the original patent but forms no part of this reissue specification; matter printed in italics indicates the additions made by reissue.

STATEMENT REGARDING FEDERALLY SPONSORED RESEARCH OR DEVELOPMENT

This invention was made with government support under NSF Grant CHE-0107178. The United States government may have rights in this invention.

BACKGROUND OF THE INVENTION

1. Technical Field

The present invention is directed, generally, to polythiophenes, and, more particularly, to head-to-tail coupled regioregular polythiophenes, block copolymers made therefrom, and methods of forming the same.

2. Background

Conducting polymers, such as polythiophenes (PTs), represent a class of polymers that are lightweight, highly processable and exhibit relatively high environmental stability, thermal stability, and electrical conductivity. These materials can be synthetically tailored to achieve desired properties such as melting point, electrical conductivity, optical and microwave absorbance and reflectance, and electroluminescene. Compared to inorganic metals and semiconductors, electrically conductive polymers have been found to be promising candidates for numerous applications, ranging from electronic and optical devices, such as field-effect transistors, sensors, light-emitting diodes (LEDs), rechargeable batteries, smart cards, and non-liner optical materials, to medical applications, such as artificial muscles.

Due, in part, to the increased demand for employing conducting polymers into a wide range of electrical and optical equipment, efforts have been made to advance the ways in which electrically conducting polymers can be improved for even greater integration into these applications. Numerous attempts to produce electrically conductive polymers that exhibit the electronic and optical properties of semiconductors and metals and the mechanical and processing advantages of typical plastics have, thus far, yielded little success. These attempts typically employ one of two distinct methods—the formation of polymer blends, and the synthesis of block copolymers.

Techniques that incorporate blends and/or composites of conducting polymers and conventional polymers include chemical and electrochemical in situ polymerization. These methods include mechanically mixing two or more conducting and conventional polymers to form a polymer blend. Blending methods are relatively simple and cost effective when compared to methods that produce block copolymers, and can be found in various publications, such as, for example, H. L. Wang, L. Toppare, J. E. Fernandez, Macromolecules, 23, 1053 (1990); K. Koga, S. Yamasaki, K. Narimatsu, M. Takayanagi, Polym. J . 1989, 21(1989), 733 (1989); Synthetic Metals, 21, 41 (1989); Synthetic Metals, 28, c435 (1989); Synthetic Metals, 37, 145 (1990); Synthetic Metals, 37, 195 (1990); Macromolecules, 25, 3284 (1992); Synthetic Metals, 22, 53 (1987); Macromolecules, 22, 1964 (1989); Polymer, 39, 1992 (1989): and U.S. Pat. Nos. 5,427,855 and 5,391,622.

Although the methods disclosed in these publications are said to provide some advancement in the area of electrically conductive polymers, these methods include various processing difficulties. For example, one significant difficultly relates to the tendency of the blends to form highly heterogeneous two-phase systems. The high degree of phase separation is a result of the relatively small enthalpy of mixing typically associated with macromolecular systems that limits the level of molecular intermixing needed to alter the physical properties of each of the components of the blends. Accordingly, conducting polymer blends that exhibit both high electrical conductivity and good mechanical properties are very limited. In addition, conventional blending methods typically encounter the existence of a sharp threshold, known as "percolation" threshold, which is the lowest concentration of conducting particles needed to form continuous conducting chains when incorporated into another material. The percolation threshold for conductivity of the blends is met at about 16% volume fraction of the conducting polymer. This threshold is described in detail in Synthetic Metals, 22(1), 79, (1987) and the references cited therein. Due, in part, to the "percolation" effect, it is difficult to tailor the moderate electrical conductivity for a variety of uses that include the dissipation of static charge.

The second approach to improve the processability and mechanical properties of electrically conductive polymers is through the synthesis of block copolymers. Block copolymers are typically formed from the reaction of conducting polymers and conventional polymers (i.e. structual polymers such as polystyrenes, polyacrylates, polyurethanes, and the like), the product of which exhibit a combination of the properties of their segment polymers. Accordingly, segment polymers can be chosen to form copolymer products having attractive mechanical properties. Furthermore, the covalent linkage between the polymer segments allows phase separation to be limited at the molecular level, thereby providing a more homogeneous product relative to polymer blends.

Although the advantages of block copolymers over polymer blends have long been recognized, it has been found that incorporating the conducting polymer segments into block copolymers is difficult. Intrinsic electrically conducting polymers consist of a backbone of repeating units with $\pi$ conjugation that limits their formation by conventional polymerization methods, such as radical polymerization, ionic polymerization or ring opening polymerization. Therefore, methods to incorporate electrically conducting polymers with other polymers are limited, and typically include linkage of short conjugated segments by flexible spacers to multi-block polymers. These previously reported block copolymers have not shown good electrical properties or nanophase separation morphology due to the short $\pi$ conjugation. Recently, there have been a number of attempts to synthesize block copolymers that exhibit a nanophase separation morphology. Synthetic Metals, 41–43, 955 (1991); Nature, 369, 387 (1994); Synthetic Metals, 69, 463 (1995); Science, 279, 1903 (1998); Macromolecules, 29, 7396 (1996); Macromolecules, 32, 3034 (1999); J. Am. Chem. Soc., 122, 6855 (2001); J. Am. Chem. Soc., 120, 2798 (1998). However, few of the synthesized block copolymers have been found to exhibit good electrical properties, such as conductivity. Moreover, the processes employed to synthesize these polymers include tedious step-by-step organic synthesis to build the block copolymers, or they lack diversity in the types of copolymers available.

The discovery of additional applications and new technologies for conductive block copolymers is subject, in large part, to molecular designers ability to control the structure, properties, and function of their chemical synthesis. Those in the art have come to recognize that structure plays an important, if not critical role, in determining the physical properties of conducting polymers. PTs represent a class of conducting polymers that are thought to have the potential for furthering the advancement of new and improved applications for conductive block copolymers.

Because of its asymmetrical structure, the polymerization of 3-substituted thiophenes produces a mixture of PT structures containing three possible regiochemical linkages between repeat units. The three orientations available when two thiophene rings are joined are the 2,2', 2,5', and 5,5' couplings. When application as a conducting polymer is desired, the 2,2' (or head-to-head) coupling and the 5,5' (or tail-to-tail) coupling, referred to as regiorandom couplings, are considered to be defects in the polymer structure because they cause a sterically driven twist of thiophene rings that disrupt conjugation, produce an amorphous structure, and prevent ideal solid state packing, thus diminishing electronic and photonic properties. The steric crowding of the solubilizing groups in the 3 position leads to loss of planarity and less π overlap. In contrast, the 2,5' (or head-to-tail (HT) coupled) regioregular PTs can access a low energy planar conformation, leading to highly conjugated polymers that provide flat, stacking macromolecular structures that can self-assemble, providing efficient interchain and intrachain conductivity pathways. The electronic and photonic properties of the regioregular materials are maximized.

HT-poly-alkylthiophenes (HT-PATs) are conjugated polymers in which the alkylthiophene rings are connected in the head-to-tail fashion. One of the inventors of the present invention developed the first regioselective synthesis of this class of polymer (R. D. McCullough et al., J. Am. Chem. Soc., 113, 4910 (1993), and references cited therein) and a method to synthesize these polymers on a large scale (U.S. Pat. No. 6,166,172), which are incorporated by reference herein in their entirety. The "defect-free" conjugation in these polymer chains leads to better π-π between-chain overlap and give rise to highly ordered, conducting polymer structures in solid state films. This solid state structural order allows charges to travel freely without being trapped or retarded by defects. Therefore, regioregular HT-PAT films have much higher conductivity than their regiorandom analogs. In fact, HT-PATs represent one of the classes of polymers with the highest electrical conductivity.

Although the McCullough methods have made important strides in the formation of electrically conductive block copolymers, certain deficiencies exist in their application and the resultant products formed therefrom. Most significantly, it has been difficult, if not impossible, to predict with any degree of certainty the type and amount of specific end groups, such as H/Br, H/H, and Br/Br, that are produced through application of these methods. Because the end group formation of HT-PAT product is random, the reaction typically forms products mainly having amounts of either the H/H or H/Br end groups that range from 35% to 65% by weight, but are typically nearly evenly divided in amounts ranging from 45% to 55% by weight. As a result, these methods do not provide HT-PATs with well-defined, specific end-groups, inhibiting functionalization of the defined HT-PATs and incorporation of end group functionalized HT-PATs into block-copolymers with structural polymers, such as polystyrenes, polyacrylates, polyurethanes, and the like.

Accordingly, the need exists for HT-PATs and electrically conducting block copolymers formed therefrom that exhibit, or can be synthesized to exhibit, characteristics of the electronic and optical properties of semiconductors and metals and mechanical properties and processing advantages of typical plastics, and their methods of manufacture. Furthermore, new methods for preparing HT-PATs and block copolymers formed therefrom are needed that are efficient, economical, provide end group control, and produce novel block copolymers containing HT-PAT conductive segments that have both high electrical conductivity and excellent mechanical properties.

SUMMARY OF THE INVENTION

This invention provides HT-PATs and their methods of formation, as well as block copolymers and their methods of formation from the HT-PATs, having attractive mechanical properties and excellent electrical conductivity. Specifically, this invention provides syntheses of block copolymers containing regioregular head-to-tail poly(3-alkylthiophenes) conductive segments.

In one embodiment, a polythiophene polymer is provided having the structure:

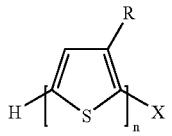

wherein R is a substituent selected from the group consisting of alkyl, polyether, and aryl, X is a halogen, and n is greater than 1. The polythiophene polymer is formed from a polymerization reaction in major amounts of at least 90% by weight.

In another embodiment, a polythiophene polymer is provided having the structure:

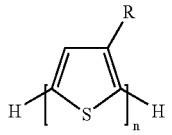

wherein R is a substituent selected from the group consisting of alkyl, polyether, and aryl, and n is greater than 1. The polythiophene polymer is formed from a polymerization reaction in major amounts of at least 90% by weight.

The present invention provides a method of forming the polymers set forth above. One method includes combining a soluble thiophene monomer with an amide base and a divalent metal halide, and adding an effective amount of a Ni(II) catalyst to initiate a polymerization reaction to form at least 90% by weight of the polymer having the structure:

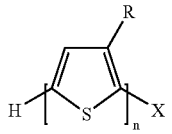

wherein R is a substituent selected from the group consisting of alkyl, polyether, and aryl, X is a halogen, and n is greater than 1.

Another method of forming a polymer is set forth herein, and includes combining a soluble thiophene monomer with an amide base and zinc chloride at a temperature ranging from −78° C. to −60° C., and adding an effective amount of a Ni(II) catalyst to initiate a polymerization reaction.

In another embodiment, the present invention provides a method of forming a polymer that includes combining a soluble thiophene with an organomagnesium reagent. The organomagnesium reagent has the formula R'MgX'. R' is a substituent selected from the group consisting of alkyl, vinyl and phenyl and X' is a halogen, to form at least 90% by weight of a polythiophene polymer having the structure:

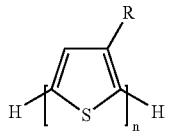

wherein R is a substituent selected from the group consisting of alkyl, polyether, and aryl, and n is greater than 1.

The present invention also provides a method of forming a polymer that includes combining a soluble thiophene monomer with an amide base and a divalent metal halide, and adding an effective amount of a first Ni(II) catalyst to initiate a polymerization reaction to form at least 90% by weight of an intermediate polymer having the structure:

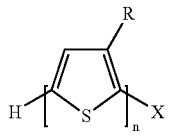

wherein R is a substituent selected from the group consisting of alkyl, polyether, and aryl, X is a halogen, and n is greater than 1. Added to the intermediate polymer is a derivative compound represented by the formula PFG-A-MX' and a second Ni(II) catalyst to form a protected thiophene polymer, wherein PFG is a hydroxyl or amine functional group, A is selected from the group consisting of alkyl and aromatic, M is a selected from the group consisting of Zn or Mg, and X' is a halogen. The thiophene polymer is deprotected in an acid environment to form the deprotected polymer having one functional end group.

In another embodiment, the present invention provides a method of forming a polymer that includes combining a soluble thiophene monomer with an amide base and zinc chloride at a temperature ranging from −78° C. to −60° C. and adding an effective amount of a first Ni(II) catalyst to initiate a polymerization reaction and form an intermediate polymer. A derivative compound represented by the formula PFG-A-MX' and a second Ni(II) catalyst is added to the intermediate polymer to form a protected thiophene polymer, wherein PFG is a hydroxyl or amine functional group, A is selected from the group consisting of alkyl and aromatic, M is a selected from the group consisting of Zn or Mg, and X' is a halogen. The protected thiophene polymer is deprotected in an acid environment to form the deprotected polymer having one functional end group.

In another aspect of the present invention, a protected thiophene polymer is provided having the structure:

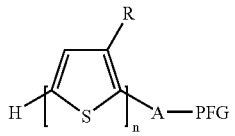

wherein PFG is a protected hydroxyl or amine functional group, and A is selected from the group consisting of alkyl and aromatic.

The present invention also provides a deprotected polymer having one functional end group having the structure:

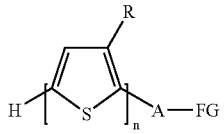

where R is selected from the group consisting of alkyl, polyether, and aryl; n is greater than 1; A is selected from the group consisting of alkyl and aromatic, and FG is a functional group selected from the group consisting of primary alkyl amine and primary alcohol.

In addition, another aspect of the present invention is a method of forming a poly-(3-substituted) thiophene diol, comprising combining a soluble thiophene with an organomagnesium reagent, wherein the organomagnesium reagent has the formula R'MgX' and R' is a substituent selected from the group consisting of alkyl, vinyl and phenyl and X' is a halogen, to form at least 90% by weight of a polythiophene intermediate polymer having the structure:

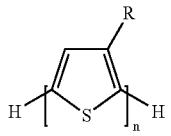

wherein R is a substituent selected from the group consisting of alkyl, polyether, and aryl, and n is greater than 1. Aldehyde groups are introduced to both ends of a chain of the intermediate polymer, and reduced to yield the poly-(3-substituted) thiophene diol.

The present invention also provides a thiophene polymer having aldehyde end groups, the polymer having the structure:

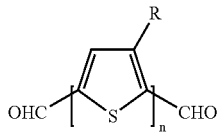

wherein R is a substituent selected from the group consisting of alkyl, polyether, and aryl, and is greater than 1.

In yet another embodiment, the present invention provides a poly-(3-substituted) thiophene diol having the structure:

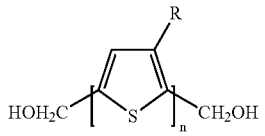

wherein R is a substituent selected from the group consisting of alkyl, polyether, and aryl, and n is greater than 1.

The present invention also provides a method of forming a diblock copolymer that includes combining a soluble thiophene monomer with an amide base and zinc chloride at a temperature ranging from −78° C. to −60° C. and adding an effective amount of a first Ni(II) catalyst to initiate a polymerization reaction and form an intermediate polymer. A derivative compound represented by the formula PFG-A-MX' and a second Ni(II) catalyst is added to the intermediate polymer to form a protected thiophene polymer, wherein PFG is a hydroxyl or amine functional group, A is selected from the group consisting of alkyl and aromatic, M is a selected from the group consisting of Zn or Mg, and X is a halogen. The protected thiophene polymer is deprotected in an acid environment to form a deprotected polymer having one functional end group. An ATRP initiator and a base are added to the deprotected polymer to form an ATRP macroinitiator. CuBr, at least one ATRP ligand, and at least one radially polymerizable monomer are added to the ATRP macroinitiator to form the diblock copolymer.

Another method of forming a diblock copolymer is presented herein, and includes providing a deprotected polymer having one functional end group having the structure:

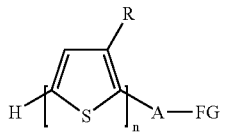

wherein R is selected from the group consisting of alkyl, polyether, and aryl; n is greater than 1; A is selected from the group consisting of alkyl and aromatic, and FG is a functional group selected from the group consisting of primary alkyl amine and primary alcohol. An ATRP initiator and a base are added to the deprotected polymer to form a ATRP macroinitiator. CuBr, at least one ATRP ligand, and at least one radically polymerizable monomer are added to the ATRP macroinitiator to form the diblock copolymer.

In another embodiment, the present invention provides a method of forming a triblock copolymer, and includes combining a soluble thiophene with an organomagnesium reagent, wherein the organomagnesium reagent has the formula R'MgX' and R' is a substituent selected from the group consisting of alkyl, vinyl and phenyl and X' is a halogen, to form at least 90% by weight of a polythiophene intermediate polymer having the structure:

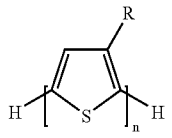

wherein R is a substituted selected from the group consisting of alkyl, polyether, and aryl, and n is greater than 1. Aldehyde groups are introduced to both ends of a chain of the intermediate polymer, and reduced to yield a poly-(3-substituted) thiophene diol. An ATRP initiator and a base are added to the diol to form an ATRP macroinitiator. CuBr, at least one ATRP ligand, and at least one radially polymerizable monomer are added to the ATRP macroinitiator to form the triblock copolymer.

In another embodiment, the present invention provides a method of forming a triblock copolymer that includes providing a poly-(3-substituted) diol having the structure:

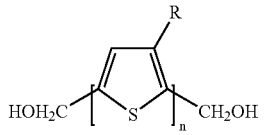

wherein R is a substituent selected from the group consisting of alkyl, polyether, and aryl, and n is greater than 1. An ATRP initiator and a base are added to the diol to form an ATRP macroinitiator. CuBr, at least one ATRP ligand, and at least one radially polymerizable monomer are added to the ATRP macroinitiator to form the triblock copolymer.

In yet another aspect of the present invention, a method of forming a polyurethane copolymer is provided that includes combining a soluble thiophene with an organomagnesium reagent, wherein the organomagnesium reagent has the formula R'MgX' and R' is a substituent selected from the group consisting of alkyl, vinyl and phenyl and X' is a halogen, to form at least 90% by weight of a polythiophene intermediate polymer having the structure:

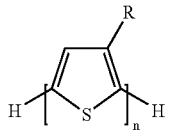

wherein R is a substituent selected from the group consisting of alkyl, polyether, and aryl, and n is greater than 1. Aldehyde groups are introduced to both ends of a chain of the intermediate polymer, and reduced to yield a poly-(3-substituted) thiophene diol. At least one dihydroxyl functional compound and at least one polyisocyanate are added to the diol to form the polyurethane copolymer.

In another embodiment of the present invention, a method of forming a polyurethane copolymer is provided that includes providing a poly-(3-substituted) thiophene diol having the structure:

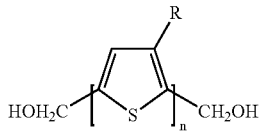

wherein R is a substituent selected from the group consisting of alkyl, polyether, and aryl, and n is greater than 1. At least one dihydroxyl functional compound and at least one polyisocyanate are added to the diol to form the polyurethane copolymer.

The present invention also provides intrinsically conductive copolymers, such as diblock, triblock, and polyurethane copolymers, having a conductivity ranging from $10^{-8}$ S/cm to 150 S/cm or more.

The present invention also provides an electrically conductive or optically sensitive polymeric material formed from any of the methods or comprising the polymers set forth herein.

BRIEF DESCRIPTION OF THE DRAWINGS

The foregoing summary, as well as the following detailed description of the preferred embodiments, will be better understood when read in conjunction with the appended drawings. In the drawings:

FIG. 1 is a MALDI MS analysis that illustrates the incorporation of an —OH functional group on one end of the HT-PHT of the present invention;

FIG. 2 is an NMR analysis that illustrates the incorporation of an —OH functional group on one end of the HT-PHT of the present invention;

FIG. 3 is a MALDI MS analysis that illustrates obtaining HT-PHT diol;

FIG. 4 is an AFM analysis that reveals the presence of a nanowire network in the solid film of an HT-PHT-block-PS diblock copolymer of the present invention;

FIG. 5 is an AFM analysis that reveals the presence of a nanowire network in the solid film of an HT-PHT-block-PMA diblock copolymer of the present invention; and FIG. 6 is a TEM analysis that reveals the presence of a nanowire network in the solid film of a HT-PHT-block-PMA diblock copolymer of the present invention.

DETAILED DESCRIPTION OF THE PREFERRED EMBODIMENTS

It is to be understood that certain descriptions of the present invention have been simplified to illustrate only those elements and limitations that are relevant to a clear understanding of the present invention, while eliminating, for purposes of clarity, other elements. Those of ordinary skill in the art, upon considering the present description of the invention, will recognize that other elements and/or limitations may be desirable in order to implement the present invention. However, because such other elements and/or limitations may be readily ascertained by one of ordinary skill upon considering the present description of the invention, and are not necessary for a complete understanding of the present invention, a discussion of such elements and limitations is not provided herein. For example, as discussed herein, the materials of the present invention may be incorporated, for example, in electronic and optical devices that are understood by those of ordinary skill in the art, and, accordingly, are not described in hi detailed herein.

Furthermore, compositions of the present invention may be generally described and embodied in forms and applied to end uses that are not specifically and expressly described herein. For example, one skilled in the art will appreciate that the present invention may be incorporated into electrical and optical devices other than those specifically identified herein.

Other than in the operating examples, or unless otherwise expressly specified, all of the numerical ranges, amounts, values and percentages such as those for amounts of materials, times and temperatures of reaction, ratios of amounts, and others in the following portion of the specification may be read as if prefaced by the word "about" even though the term "about" may not expressly appear with the value, amount, or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used.

As used herein, the term "blend" refers to a combination of at least one conducting polymer component with at least one other non-conductive polymer component, wherein the molecular intermixing of the polymer components is insufficient to significantly alter the physical properties of the individual components of the blend. As used herein, the term "copolymer" refers to a reaction product of at least two polymer components whereby the physical properties of each of the components is significantly altered, and the covalent linkage between the polymer segments allows phase separation to be limited at the molecular level to form a more homogeneous product relative to a polymer blend. The phrase "intrinsically conductive", as used herein, refers to an electrically conductive block copolymer having at least one conducting segment, such as polythiophene, pyrrole, p-phenylenevinylene, and the like, attached thereto.

The present invention provides HT-PATs with well-defined, specific end-groups, functionalization of the defined HT-PATs, and incorporation of end group functionalized HT-PATs into block copolymers with structural polymers such as polystyrenes, polyacrylates, polyurethanes, and the like. The HT-PATs, the diblock and triblock copolymers formed therefrom, and the methods of forming the same provide block copolymers having excellent conductivity and low polydispersities that are useful in a number of applications.

The HT-PATs of the present invention and their methods of formation are set forth below in Part A. The block copolymers formed from the HT-PATs and their methods of formation are set forth below in Part B.

A. End Group Functionalization of HT-PATs

The end group functionalization of HT-PATs of the present invention is shown in Schemes 1 and 2. Scheme 1 illustrates the synthesis of a well-defined regioregular HT-PATs with one functional end group, and proceeds as follows:

Scheme 1
Synthesis of regioregular head-to-tailpoly (3-alkylthiophenes) with one functional end group

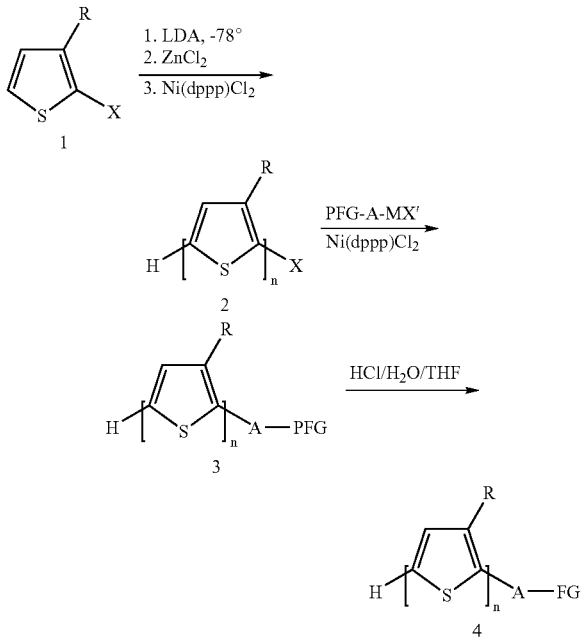

-continued

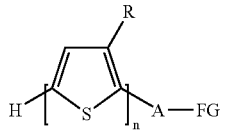

4 wherein R is an alkyl group usually having 1 to 15 carbon atoms, typically having 4 to 15 carbon atoms, and more typically having 4 to 12 carbon atoms (such as butyl, hexyl, octyl, or dodecyl), an ether group, or aryl group; X is a halogen such as Cl, Br, or I; n is greater than 1; A is a spacer component, and when present, is an alkyl or aromatic group (such as, for example, pyrrole, benzene or thiophene); M is Zn or Mg; X' is a halogen, such as Cl, Br, or I; PFG is a hydroxyl or amine protected functional group, such as —$CH_2CH_2OTHP$ (i.e. —$CH_2CH_2O$(tetrahydropyran)), —$CH_2CH_2OTMS$ (i.e. —$CH_2CH_2O$(trimethylsilane)), or

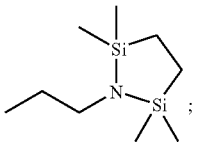

and FG is a primary alkyl amine or primary alcohol functional group such as carboxylic acid, —$CH_2CH_2OH$, or —$CH_2CH_2CH_2NH_2$.

Thiophene compound 1 may be various purified halogenated thiophene monomers having the attached R group defined above. Any suitable thiophene monomer may be employed depending on the product that is desired. For example, one suitable thiophene monomer staring material is 2-bromo-3-hexylthiophene. Compound 1 should be relatively pure to give the highest molecular weight yields. Typically, purity levels are at least 95%, and may be about 99% or more pure. Purified compound 1 may be formed by methods known by those of ordinary skill in the art.

As set forth below in the examples, compound 1 may be reacted with about one equivalent of an amide base, such as lithium diisopropylamide (LDA), followed by transmetallation with at least about one equivalent of zinc chloride. The reaction proceeds at cryogenic temperatures of −60° C. or less (i.e. colder), and typically range from −78° C. to −60° C. It has been found that zinc chloride, When reacted with the thiophene starting materials at cryogenic temperatures, provides particularly good results when compared to other divalent metal halides, such as magnesium bromide. Comparative examples are illustrated below in Examples 1 and 8.

A Ni(II) catalyst, such as, for example, 1,3-diphenylphosphinopropane nickel(II) chloride (Ni(dppp) $Cl_2$) or 1,2-bis(diphenylphosphino)ethane nickel(II) chloride (Ni(dppe)$Cl_2$), may be added to the reaction in amounts ranging from 0.5 to 10 mol %. The Ni(II) catalyst may be added either at the cryogenic reaction temperature at which the LDA and zinc chloride is added, and then warmed to room temperature (about 25° C.), or the catalyst may be added during the warming period or after the solution is warmed to room temperature. The solution may be quenched with an excess of suitable solvent, such as methyl alcohol, at room temperature to form intermediate PAT polymer 2.

As illustrated in Scheme 1, polymer 2 is a regioregular HT-PAT, and has major amounts of H/Br end groups. The synthesis allows the H/Br end groups present in the HT-PAT product to be controlled and accurately calculated. As set froth below, the H/Br end groups are present as product in at least 90% by weight[, and typically in amounts of at least about 95% by weight]. Due to the chemically stable nature of polymer 2, the end groups off one side of polymer 2 is modifiable and can be made functional.

Polymer 2 may be made functional by the reaction of a derivative compound and a Ni(II) catalyst to form protected polymer 3. To polymer 2 may be added 1 to 100 equivalents of the derivative compound represented by the expression PFG-A-MX', as defined above, and 0.5 to 10 mol % of the Ni(II) catalyst, such as, for example, 1,3-diphenylphosphinopropane nickel(II) chloride (Ni(dppp) $Cl_2$) or 1,2-bis(diphenylphosphino)ethane nickel(II) chloride (Ni(dppe)$Cl_2$). Suitable PFG-A-MX' thiophene derivatives include, for example, compounds having the structure

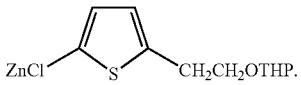

the PFG-A-MX' compound may be formed in any manner known to those of ordinary skill in the art, such as, for example, by the following reaction:

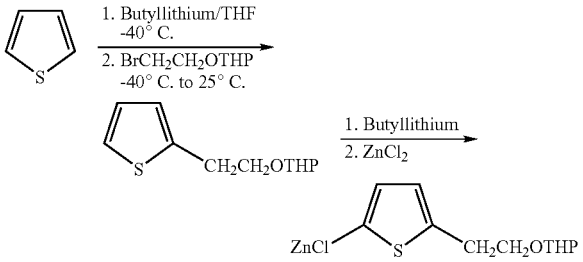

The reaction to form polymer 3 is carried out for a period of time sufficient to form the protected thiophene polymer 3, typically for at least about one hour. Reaction temperatures typically range from 40° C. to 60° C.

Deprotection of polymer 3 may be accomplished in an acid environment with a suitable anhydrous solvent to form the deprotected monofunctional HT-PAT polymer 4. Although an excess of any type of acid agent may be added to create an acid environment suitable to solubilize polymer 3, an excess of hydrochloric acid and water, for example, may be added with a refluxing anhydrous solvent (dry solvent), such as tetrahydrofuran (THF), to form the non-protected HT-PAT with one functional end group, polymer 4. THF is commercially available from Fisher Scientific, Pittsburgh, Pa. The deprotection reaction is typically conducted at room temperature.

Excess of reagents are typically employed to drive the modification reactions to completion to give greater than 95% yield for all of steps subsequent to the synthesis of HT-PAT and yield polydispersity indices (PDI) of 1.2 to 1.5, and typically 1.2 to 1.3. Purification of all steps may be achieved by precipitation and filtration. Therefore, each step of the end group modification may have a high yield of greater than 95%. Scheme 1 shows the approach to monofunctionalization, i.e., functionalization of only one end of each HT-PAT chain, wherein, for example, compounds bearing protected functional groups (PFG-A-MX') react with the HT-PATs followed by the deprotection of the functional groups to give HT-PATs with functional groups such as —OH and —$NH_2$. Both NMR and matrix-assistedlaser-desorption/ionization mass spectroscopy (MALDI MS), a mass analysis techniques developed by Professor Franz Hillenkamp and Dr. Michael Karas of the University of Munster, Germany, confirmed the success of the end group modification. MALDI analysis is disclosed in various publications, such as, for example, Karas, M., Hillenkamp, F., Anal. Chem., 60, 2299 (1988); Hillenkamp, F., Karas, M., Beavis, R. C., Chait, B. T., Anal. Chem., 63, 1193A (1991); Liu, J., Loewe, R. S., McCullough, R. D., Macromolecules, 32, 5777 (1999), each of which is incorporated by reference herein in its entirety.

For example, a starting material 2-bromo-3-hexylthiophene was treated with LDA, followed by transmetallation with $ZnCl_2$. The 2-bromo-3-hexyl-5-chlorozincthiophene was polymerized with $Ni(dppp)Cl_2$ to give HT-poly (3-hexylthiophene) (PHT) in 37% yield. The reaction was optimized and the polymer end-groups characterized by MALDI-MS.

The monofunctional product of Scheme 1 is employed as the starting material of Scheme 3, discussed hereinbelow, in the preparation of conducting diblock copolymers of the present invention.

Scheme 2 illustrates the method of the present invention for functionalization at both ends of a thiophene starting material (i.e. difunctionalization) that allows for the synthesis of, for example, polystyrene and polymethylacrylate triblock copolymers and polyurethane elastomers containing HT7PATs. The method may be illustrated as follows:

Scheme 2
Synthesis of regioregular head-to-tailpoly (3-alkylthiophenes) with one functional end group

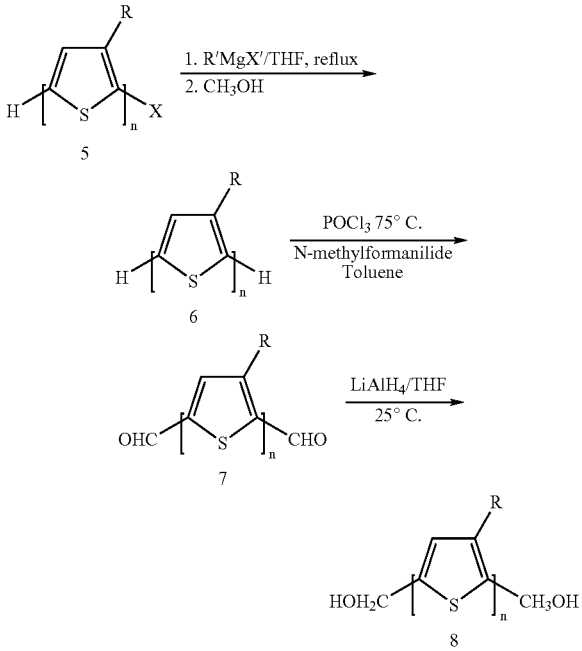

wherein X may be any halogen, such as Br or I, n is greater than 1, and R may be any non-reactive or protected reactive substituent that is non-reactive with the organomagnesium Grignard reagent (R'MgX'). R may be an alkyl or an ether group, but typically is an alkyl or substituted alkyl. The organomagnesium reagent (R'MgX') may be any Grignard reagent. X' may be any halogen, but is typically Br or Cl, and R' is typically any alkyl, vinyl, or phenyl group. Examples of suitable R' substituents include, without limitation, methyl, vinyl, $—C_3H_7$, $—C_6H_{13}$, $C_{12}H_{25}$, isopropyl, and tert-butyl groups.

Thiophene polymer 5 may be various purified halogenated thiophene monomers having the attached R group defined above. Any suitable thiophene monomer may be employed depending on the product that is desired. Purified, brominated thiophene is one example, but any halogen and any nonreactive substituent that provides solubility may be used. The leaving groups may be any halogens, such as Br, Cl, or I. Bormine is preferred over iodine as the leaving group in the starting monomer because the iodine compound substantially increases the toxicity of the reaction to inhibit the same. Polymer 5 should be relatively pure to give the highest molecular weight yields. Typically, at least 95% of the starting material should be the thiophene starting material, and may be at least 99% or more pure. The thiophene starting material may include a mixture of thiophene monomers having H/H, H/Br, and Br/Br end groups, provided their aggregate amounts meet or exceed the preferred purity levels set forth herein. Purified compound 5 may be formed by the methods discussed herein.

Polymer 5 may be reacted with at least one equivalent of an organomagnesium (Grignard) reagent, in refluxing solvent, for a sufficient period of time, typically at least one hour, and then quenched to produce polymer 6.

A Grignard metathesis reaction is employed to dehalogenate the HT-PATs. The Grignard metathesis reactions are well known in the art, an example of which is described by L. Boymond, M. Rottlander, G. Cahiez, and P. Knochel, Angew. Chem. Int. Ed., Communications, 37, No. 12, pages 1701–1703 (1998), which is incorporated herein by reference in its entirety. If the R group is reactive with the organomagnesium reagent, a protective group should be coupled with the R group to prevent the R group from taking part in the synthesis. The use of protective groups with a relative R group is well known in the art, as described by Greene and Greene, "Protective Groups in Organic Synthesis," John Wiley and Sons, New York (1981), which is incorporated herein by reference in its entirety.

Any refluxing anhydrous solvent (dry solvent) in which polymer 5 is soluble, such as THF, may be employed in the formation of the intermediate polymer 6. Formation of polymer 6 should be performed at temperatures at or below the boiling point of the refluxing solvent, and can be performed at room temperature (25° C.). For example, when THF is employed, the reaction should be performed at its boiling point temperature (66° C.). Thereafter, the product may be quenched, such as with excess water or methyl alcohol, to yield a pure HT-PAT having a substantial majority of H/H end groups. The synthesis allows the H/H end groups present in the HT-PAT product to be controlled and accurately calculated. As set froth below, the H/H end groups are present as product (polymer 6) in at least 95% by weight, and typically in amounts of 99% by weight or greater. In some embodiments of the present invention, essentially all, 100% by weight, of the product from the metathesis reaction is HT-PTAs having H/H end groups.

A Vilsmeier reaction may be used to introduce the aldehyde groups to both ends of each chain to produce polymer 7, as determined by MALDI-MS. The Vilsmeier reaction is disclosed in various publications, for example, Vilsmeier, A., Haack, A., Ber., 60, 119 (1927), which is incorporated herein by reference in its entirety. N-methylformanilide or dimethylformamide along with an excess of $POCl_3$ and a solvent may be employed in the reaction. Suitable solvents include, for example, toluene, 1,2-dichlorobenzene, xylenes, chlorobenzene, 1,2-dichloroethane, dimethylformamide, and chloroform. Thereafter, the solution may be quenched, and precipitated, and washed to form polymer 7. Various processing conditions known to those skilled in the art may be employed in the Vilsmeier reaction. For example, the Vilsmeier reaction may be employed such that about 0.2 mmol of polymer 6 in about 125 ml of dry toluene with about 40 mmol of methylformanilide and about 30 mmol of $POCl_3$ at 75° C. for 24 hours provides acceptable reaction product. Quenching with aqueous sodium acetate for 2 hours at room temperature, precipitating in methanol, and washing by Soxhlet extraction in methanol yields 97% of the polymer 7.

The PAT containing two aldehyde end-groups is verified by NMR and MALDI. The aldehyde end groups are reduced with 1 to 100 equivalents of a reducing agent, such as $NaBH_4$, $LiAlH(OEt)_3$, $LiAlH(To\text{-}Bu)_3$, $B_2H_6$, sodium bis(2-methoxyethoxy)aluminum hydride (aka Red-Al or Vitride), or $LiAlH_4$ to yield a PAT terminated by hydroxyl groups (copolymer 8). MALDI-Time-of-Flight (TOF) proves the incorporation of terminal hydroxyl group to both ends of the polymer chain, and that difunctional HT-PATs are achieved.

B. End Group Functionalization of HT-PATs Into Block Copolymers

The incorporation of the end group functionalized HT-PATs into block copolymers is shown in Schemes 3, 4, and 5. In Schemes 3 and 4, atom-transfer-radical-polymerization (ATRP) is used to incorporate the HT-PATs with some conventional polymers such as polystyrene and polyacrylates. ATRP is a well-developed "living" radical polymerization that generates well-defined polymers, representative methods of which are described in Wang, J.-S. and Matyjaszewski, K., J. Am. Chem. Soc., 117, 5614–5615 (1997); Patten, T. E., Xia, J, Abernathy, T., and Matyjaszewski, K., Science, 272, 866–868 (1996); Matyjaszewski, K., Patten T. E., and Xia, J., J. Am. Chem Soc., 119, 674–680 (1997); and Matyjaszewski, K., Gobelt, B., Paik, H.-J., and Horwitz, C. P., Macromolecules, 34, 430–440 (2001), each of which is incorporated by reference herein in its entirety.

For example, one synthesis of an ATRP macroinitiator may be illustrated as follows:

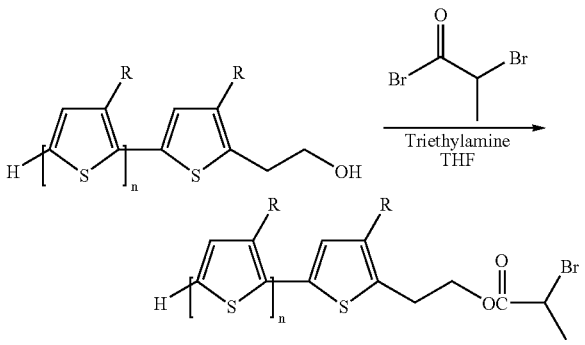

wherein R may be an alkyl group, an ether group, or an aryl group, and n is greater than 1.

The non-protected HT-PAT polymer product 4 of Scheme 1 is employed as the starting material of Scheme 3, for the preparation of conducting diblock copolymers of the present invention. As set forth above, the synthesis of diblock copolymers of HT-PATs can be accomplished by first preparing a well-defined PAT with at least 90% by weight, [and preferably 95% by weight,] of its end groups containing one proton end-group and one halogen end-group, such as Br.

Although polymer 4, described above, is defined as having the structure

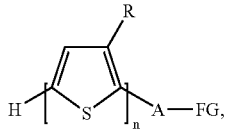

in order to more clearly illustrate the mechanism of Scheme 3, Scheme 3 will now be illustrated such that polymer 4 is one possible PAT, wherein A is a thiophene group, and FG is —$CH_2CH_2OH$. The discussion set forth hereinbelow relating to the preparation of diblock copolymers using this particular embodiment is intended to be illustrative only, and not intended to limit the scope of the claims. Given the teaching set forth herein, one of ordinary skill in the art will understand that polymer 4 may be any thiophene polymer having a terminating alcohol group thereon, and will readily be able to employ numerous other polymers that satisfy the criterion set froth in defining polymer 4, and the reaction components of Scheme 3. The method may be illustrated as follows:

Scheme 3 Preparation of conducting diblock colpolymers

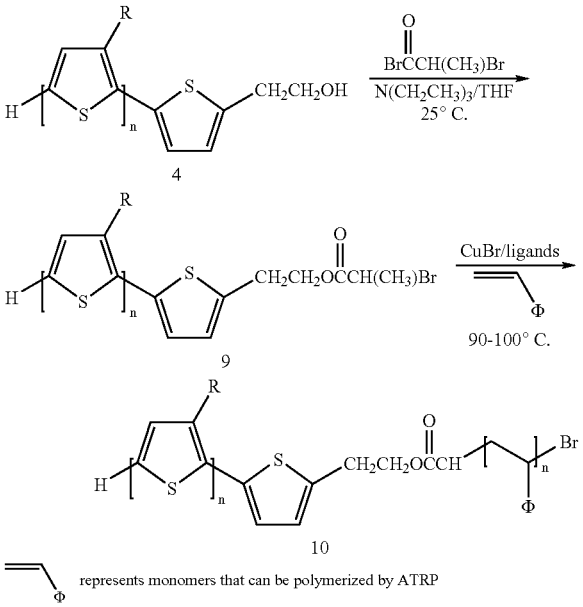

wherein R, as discussed above, may be an alkyl group usually having 1 to 15 carbon groups, typically 4 to 15 carbon groups, and more typically having 4 to 12 carbon groups (such as butyl, hexyl, octyl, or dodecyl), an ether group, or an aryl group, and n and m are each greater than 1.

Polymer 4 may be modified by the reaction with about one equivalent of any ATRP initiator disclosed in the publications by Dr. K. Matyjaszewski discussed above, such as 2-bromopropionyl bromide, a mild base, typically an amine such as $N(CH_2CH_3)_3$, and THF. The reaction is typically conducted at room temperature to generate an ATRP macroinitiator (e.g. polymer 9). To the polymer initiator 9 may be added in catalytic amounts of CuBr. Any ATRP ligands, such as pentamethyldiethylenetriamine (PMDTA), and any radical polymerizable monomers suitable in ATRP, such as styrenes, substituted styrenes, and acryaltes, such as methyl acryalte, as disclosed in the publications by Dr. K. Matyjaszewski, may be employed in Scheme 3. Reaction temperatures typically range from 90° C. to 100° C. to form the diblock copolymers (e.g. copolymer 10) of the present invention. The amount of radical polymerizable monomer added to the system varies depending on the desired end product.

As an example, polyhexylthiophene-polystyrene (PHT-PS) and polyhexylthiophene-polymethylacrylate (PHT-PMA) may be made by ATRP modifying PHT with 2-bromopropionyl bromide to generate polymer 9 as the macroinitiator, following by reaction with styrenes or methyl acrylate as the monomer, and CuBr/N,N,N',N',N''-pentamethyldiethylenetriamine (PMDTA) as the catalyst. ATRP using a PHT macroinitiator 9 (0.1 g, about 0.012 mmol) was dissolved in the mixture of freshly distilled toluene and monomers (1:1 when monomer is styrene; 3:1 when monomer is methyl acrylate). To this solution CuBr (0.013 g, 0.125 mmol) and PMDTA (0.027 g, 0.125 mmol) were added. After being purged with nitrogen for 15 minutes, the solution was placed into the oil bath of 90° C. Copolymers with different ratios of PHT were obtained by pouring the solution into methanol after different periods of time. After the precipitation and filtration, the polymer was dissolved in THF followed by passing through an $Al_2O_3$ column to eliminate the catalyst. The percentage of the polystyrene or polymetharcrylate block is completely controlled by the feed ratio of the monomers as confirmed by NMR and size-exclusion chromatography. High molecular weights and low polydispersities are produced by this combination.

The non-protected HT-PAT diol polymer product 8 of Scheme 2 is employed as the starting material of Scheme 4 to form conducting triblock copolymers. In this manner regioregular HT-PATs can be functionalized on both α and ω ends, that allow for the synthesis of triblock copolymers, such as polystyrene and polymethylacrylate, and polyurethane elastomers containing HT-PAT. The method may be illustrated as follows:

Scheme 4 Preparation of conducting triblock copolymers

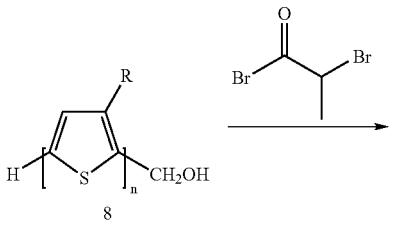

-continued

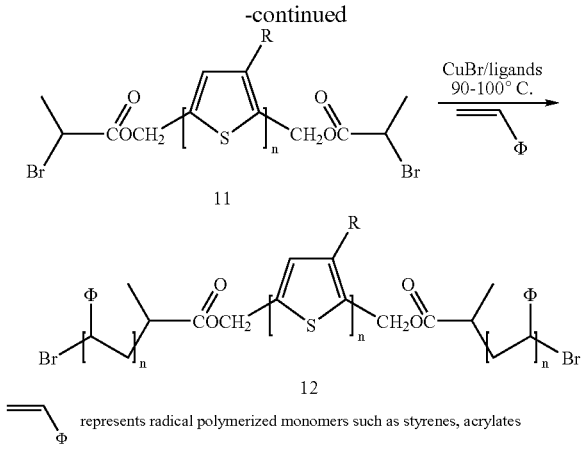

wherein R, as discussed above, may be an alkyl or an ether group, but typically is an alkyl or substituted alkyl, and n and m are each greater than 1.

Polymer 8 may be modified by the reaction with about two equivalents of any ATRP initiator disclosed in the publications by Dr. K. Matyjaszewski discussed above, such as 2-bromopropionyl bromide, a mild base, typically an amine such as $N(CH_2CH_3)_3$, and THF. The reaction is typically conducted at room temperature to generate an ATRP macroinitiator (e.g. polymer 11). Any ATRP ligands, such as PMDTA, and any radical polymerizable monomers suitable in ATRP, such as styrenes, substituted styrenes, and acryaltes, such as methyl acrylate, as disclosed in the publications by Dr. K. Matyjaszewski, may be employed in Scheme 4. Reaction temperature typically range from 90° C. to 100° C. to form the triblock copolymers 12 of the present invention. The amount of radical polymerizable monomer added to the system varies depending on the desired end product.

From polymer 11, well-defined triblock copolymers PS-PHT-PS and PMA-PHT-PMA 12 of high molecular weight with low polydispersities by using ATRP with styrene or methyl acrylate as the monomer. Percentages of the PS or PMA corresponded to the feed ratio of the monomer.

Moreover, the non-protected HT-PAT polymer product 8 of Scheme 2 is employed as the starting material of Scheme 5, that illustrates a manner in which regioregular HT-PATs can be functionalized on both α and ω ends to allow for the synthesis of polyurethane elastomers containing HT-PAT. The method may be illustrated as follows:

Scheme 5 Preparation of conducting polyurethane rubber

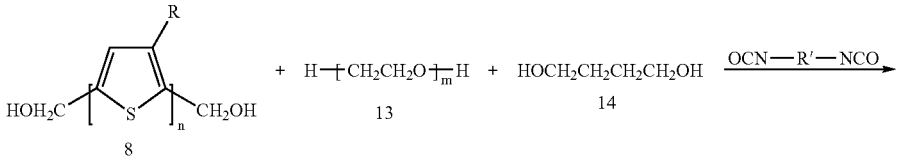

-continued

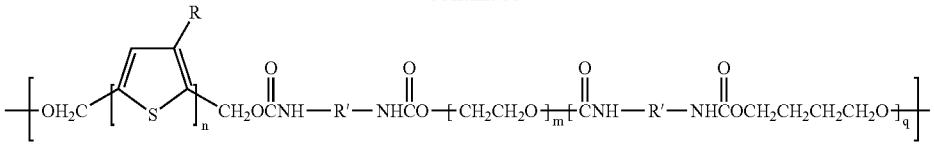

15 wherein R, as discussed above, may be an alkyl or an ether group, but typically is an alkyl or substituted alkyl, and n, m, and q are each greater than 1, and OCN—R'—NCO represents polyisocyanates, such as tolyl diisocyanate and methylene phenyl diisocyanate.

Although Scheme 5 is illustrated as a specific reaction mechanism that includes specific dihydroxyl functional materials (13, 14), one of ordinary skill in the art will recognize that Scheme 5 provides one possible reaction mechanism to form conducting polyurethane rubber, and that numerous other dihydroxyl functional materials (13, 14), and polyisocyanate materials may be employed in Scheme 5 to form various conducting polyurethane rubbers. Accordingly, Scheme 5 is intended to be illustrative only, and not intended to limit the scope of the claims.

For example, when polymer 8 is hydroxy-functionalized poly(3-hexylthiophene), by reacting the α, ω hyroxy-functionalized poly(3-hexylthiophene) with toluene diisocyanate, 1,4 butanediol and polyethylene glycol (PEG, $M_n$=1.5K), polyurethane elastomers (14) may also be prepared containing the conducting polymer blocks.

Thin films of PHT-PS and PHT-PA (i.e. products of Scheme 3), PS-PHT-PS and PA-PHT-PA (i.e. products of Scheme 4), and polyurethane elastomers (i.e. the product the Scheme 5), were generated by the slow evaporation of toluene solution to give magenta to purple films with excellent mechanical properties. These films were oxidized by exposure to $I_2$ vapor to give multifunctional polymers with high electrical conductivities (Table 1) as determined by four-point probe conductivity measurements.

TABLE 1

Conductivity of block copolymers containing HT-PHT

| | | | | |
|---|---|---|---|---|
| | PS-PHT Diblock Copolymers | | | |
| wt % of HT-PHT[a] | 100% | 37% | 22% | 14% |
| Average $M_n$[b] | 16,800 | 30,200 | 41,400 | 53,400 |
| $M_w/M_n$[b] | 1.28 | 1.31 | 1.32 | 1.45 |
| Conductivity (S/cm) | 110 | 4.7 | 0.08 | 0.14 |
| | PS-PHT-PS Triblock Copolymers | | | |
| wt % of HT-PHT[a] | 100% | 52% | 26% | 7.7% |
| Average $M_n$[b] | 17,900 | 25,500 | 38,100 | 93,600 |
| $M_w/M_n$[b] | 1.23 | 1.21 | 1.25 | 1.51 |
| Conductivity (S/cm) | 96 | 5.3 | 0.43 | 0.05 |
| | PA-PHT-PA Triblock Copolymers | | | |
| wt % of HT-PHT[a] | 100% | 45% | 18% | 10% |
| Average $M_n$[b] | 17,900 | 29,700 | 50,400 | 72,300 |
| $M_w/M_n$[b] | 1.23 | 1.29 | 1.41 | 1.66 |
| Conductivity (S/cm) | 96 | 3.3 | 1.6 | 0.076 |
| | Polyurethane | | | |
| wt % of HT-PHT | 10% | 6.40% | 0.60% | |
| Conductivity (S/cm) | 0.13 | 0.48 | $4.6 \times 10^{-6}$ | |

[a]represents those results determined by $^1$HNMR, and
[b]represents those results determined by GPC with polystyrene as the standard It has been found that certain embodiments of the present invention exhibit high electrical conductivities. While many copolymers containing conjugated polymers and other polymers and blends have been prepared, it is believed that the excellent conductivity values exhibited by the copolymers of the present invention, as illustrated in Table 1, have not been reported. While 100% HT-PHT has a conductivity of 110 S/cm, PHT-PS (Scheme 3) has a conductivity of about 5 S/cm for a block copolymer containing 37% HT-PHT. The conductivity drops down to 0.1 S/cm for samples containing approximately 22% of HT-PHT or less. The conductivity of the block copolymers largely depends on the ratio of the conducting blocks and the non-conducting blocks, which relates to the structural assembly. The PS-PHT-PS triblock copolymers (Scheme 4) have conductivities as high as 5 S/cm for a sample with 52% PHT. The conducting polymer polyurethane copolymers (Scheme 5) exhibit conductivities of as high as $10^{-1}$ S/cm, which is much higher than other polyurethane conjugative copolymers or blends reported in literature ($10^{-4}$S/cm). Conductivities for blends of conjugative polymers with polyvinylchloride and other conventional polymers have also been found to exhibit low conductivities of about $10^{-4}$ S/cm range.

Block copolymers of the present invention, as illustrated in Schemes 3 to 5, are intrinsically conductive block copolymers (i.e. are block copolymers having a conducting segment, such as polythiophene, pyrrole, p-phenylenevinylene, and the like, attached thereto), such as diblock and triblock copolymers (Schemes 3 and 4, respectively) and polyurethane copolymer (Scheme 5). As described in detail herein, these intrinsically conductive block copolymers have been found to exhibit conductivities that range from a low of $10^{-8}$ S/cm for certain applications to as high as several hundred S/cm or more, but typically range from $10^{-2}$ S/cm to 150 S/cm. Particular embodiments of the present invention display conductivities ranging from 1 S/cm to 150 S/cm, 5 S/cm to 150 S/cm, and 10 S/cm to 150 S/cm. The block copolymers of the present invention also have excellent film forming and good mechanical properties including elasticity in the polyurethane samples when the weight percentage of HT-PHT is moderate to low.

It has been fond that in thin and, ultra-thin films prepared by casting from toluene followed by free evaporation of a solvent, block copolymers of the present invention containing 20–30% of polythiophene self-assembled into very well-defined nanowires spaced laterally by 30–40 nm (which corresponds well to a fully extended HT-PHT block) and reaching the lengths of the order of micrometers. As an example, an AFM micrograph of a PS-PHT sample is shown where the weight percentage of PHT is 37%, film cast from 0.5 mg/ml solution in toluene. The thin film samples were then imaged using variable-taping force technique developed in recent years in the Kowalewski laboratory, and reported in Yu, M.-F., Kowalewski, T., Ruoff, R. S., Phys. Rev. Lett., 85, 1456 (2000), which is incorporated by reference herein in its entirety, with the purpose of using tapping mode AFM to study mechanical properties of materials at the nanoscale. It has been found that nanowires were clearly discernible only under "hard tapping" conditions (tens to hundreds nanonewtons) and were barely indentifiable when imaged with forces of the order of just few nanonewtons. Formation of distinct nanoscale morphologies is a common phenomenon in block (or segmented) copolymers consisting of immiscible segments. It is driven by the tendency of different blocks to form phase-separated domains. The size and shape of these domains is dictated by the length of the blocks and for typical molecular weights it is in the range from few to few tens of nanometers. The formation of nanowire structure is dictated by the immiscibility of polystyrene and poly (3-hexyl thiophene). Under such circumstances nanowires can be predicted to have a core-shell architecture, with the minority component (polythiophene) constituting the core. Such sheathed structure is consistent with variable-force experiments. Under "light tapping" conditions, the tip-sample force is not high enough to penetrate through the outer sheath of nanowires. Since the polystyrene segments in the sheath can mix with the chains from adjacent aggregates, the boundaries between nanowires are not well resolved. In contrast, under "hard tapping" conditions, the probe—sample force is high enough to deform the outer sheath and "sense" the presence of a rigid core.

Due to the nanophase separation of block copolymers, the HT-PAT blocks copolymers of the present invention tend to self-assemble into nanoscale domains. In these worm-like domains HT-PAT chains are fully extended and tightly packed together. These highly ordered π-π stacking structures make the domains highly conductive nanowires. TEM, AFM and X-ary diffraction have confirmed the present of the nanowire network in these copolymers. Because of the presence of a nanowire network, the block copolymers of the present invention have much higher electrical conductivity than any other conducting blends/composites or copolymers previously reported. In addition, the block copolymers synthesized by this method can form highly smooth coatings when cast from solution. Films of these block copolymers have much better adhesion to substrates such as glass, steel and plastics than HT-PATs. Upon doping their morphology remains uniform, and the films do not crack.

It has been found that novel nanowires morphologies in block copolymers of regioregular poly(alkylthiophenes) of the present invention provide the possibility of guiding the intrinsic self-assembly of sufficiently regular conjugated polymer chains by coupling them chemically to incompatible segments. In the simplest case, the obtained structure is the result of interplay between different driving forces of self-assembly (π-stacking vs. phase separation). Accordingly, due to strong π-interactions, the free energy landscape of rigid conjugated molecules has few deep local minima, which cannot be easily exploded under normal conditions. Thus the molecules are easily trapped in the states with high extent of local stacking but at the same time with high concentration of defects adversely affecting the bulk properties. Copolymerization with incompatible flexible segments may result in competing driving forces of self-assembly resulting in relatively easier to explore free energy landscapes. Identifying the overall features of those energy landscapes may give provide the ability to exercise control of the resulting nanostructures, and effectively provide ways to apply conjugated polymers as building blocks for future nanoscale- and molecular level electronic devices.

The block copolymers in their undoped state may be used as field-effect transistor material due to the present of highly ordered nanowire network structures. Friend et al have reported the using of HT-PATs as field-effect transistor materials (Burroughes, J. H., Bradley, D. D. C., Brown, A. R., Marks, R. N., Mackay, K., Friend, R. H., Burns, P. L., Holmes, A. R., Nature (London), 347, 539 (1990); Bao, Z., Dodabalapur, A., Lovinger, A. J., Appl. Phys. Lett., 69, 4108 (1996)). The field-effect mobilities of the block copolymers described here can be as high as 0.1 $cm^2V^{-1}s^{-1}$ . Additionally, the block copolymers in their undoped state can be used as dielectric materials.

These blocks copolymers may also be used in their undoped state for applications in which the conductivity requirements are not too high ($10^{-8}$ to $10^{-2}$ S/cm), such as static dissipation.

Doping of the block copolymers with oxidizing agents increases the conductivity to as high as several hundred S/cm. Oxidizing dopants include, but are not limited to, iodine, ferric chloride, gold trichloride, anitmoy chloride, nitrosonium tetrafloroborate. The doping can be carried out both in solution and in the solid state. Doping can also be achieved electrochemically by confining the block copolymers to an electrode surface and subjecting it to an oxidizing potential in an electrochemical cell. Block copolymers in the doped state may be used for such applications as magnetic/electrical field shielding materials (electronics package materials) and microwave absorption materials.

The present invention will be described further by reference to the following examples. The following examples are merely illustrative of the invention and are not intended to be limiting. Unless otherwise indicated, all parts are by weight.

EXAMPLES

Example 1

This example illustrates the preparation of regioregular head-to-tail poly(3-hexylthiophehe) having H/Br end groups (polymer 2 in Scheme 1).

In 50 ml of dry THF was placed 1.4 ml of distilled diisopropyl amine (10 mmol) and 3.7 ml of 2.58 M n-BuLi (9.5 mmol) at −78° C. and then the mixture was warmed to room temperature (25° C.) for 5 minutes and then cooled to −78° C. The monomer 2-bromo-3-hexylthiophene (2.5 g, 10 mmol) was added to the freshly generated LDA and the reaction stirred at −70° C. for 1 hour. Then anhydrous $ZnCl_2$ (1.43 g, 10.5 mmol) was added at −70° C. and the reaction was stirred for 1 hour. The reaction was warmed to 0° C. and 35 mg of $Ni(dppp)Cl_2$ (0.065 mmol, 0.6 mol %) was added. The mixture was warmed to room temperature and then stirred an additional 30 minutes. The polymer was precipitated from methanol. The polymer was washed/fractionated by Soxhlet extraction with methanol, hexane, ethylene chloride and THF. The THF fraction was characterized and used. $^1$HNMR ($CDCl_3$) 6.98 (s, 1H), 2.79 (t, J=7.68 Hz, 2H), 1.62 (m, 2H), 1.48 (m, 2H), 1.36 (m, 4H), 0.90 (t, J=6.33 Hz, 3H); MALDI MS $M_n$=7634, PDI=1.14, [end-group %s: H/Br: about 95%, H/H:about4%, Br/Br: about 1%;] ; GPC $M_n$=16, 800, PDI=1.28.

Example 2

This example illustrates the preparation of regioregular head-to-tail poly(3-hexylthiophene) with one —OH functional end group.

The preparation was performed as illustrated in Scheme 1. the first step of the preparation was to synthesize HT-PHT with a bromine end group (H/Br). The polymer was prepared in a manner similar to the method previously published in R. D. McCullough et al., J. Am. Chem. Soc., 113, 4910 (1993), except that anhydrous $ZnCl_2$ was used instead of $MgBr_2$.EtO, and the reaction proceeded at cryogenic temperatures of −78° C. In order to obtain high purity of end group composition of H/Br, strict control of the polymerization conditions was employed. The monomer should be relatively pure, and is typically 99% or more pure. Trace amounts of 3-hexylthiophene in the monomer were found to contribute significantly to the production of H/H chains. It was found that the amount of LDA employed should be controlled, and that, typically, LDA should be added in amounts of at least about one equivalent of the monomer.

The HT-PHT with well-defined H/Br end group structure was then used to perform the end group modification. To a 100 ml flask were added 20 ml anhydrous THF and 0.708 g of 2-(2-thienylethoxy)tetrahydro-2H-pyran (0.0025 mol). The flask was cooled to −40° C. and 1 ml of butyllithium solution (2.5M) was added. The solution was kept at −40° C. for 30 minutes, followed by the addition of 0.8 g of anhydrous $ZnCl_2$. The solution was then slowly warmed up to room temperature. This organozinc solution was transferred to a THF (30 ml) solution with 0.29 of HT-PHT with HBr end group. After the addition of 0.08 g of $Ni(dppp)Cl_2$, the solution was kept stirring at 60° C. for 5 hours. The polymer was then precipitated out in methanol and purified by reprecipitation. This polymer was deprotected with HCl/THF mixture at 40° C. for three hour and then precipitated in methanol. After filtration and drying, HT-PHT with —OH functional group was obtained with a yield of 95%. FIG. 1 and FIG. 2 show respectively the NMR and MALDI of this hydroxy functionalized head-to-tail poly(3-hexylthiophene).

Example 3

This example illustrates the preparation of regioregular head-to-tail poly(3-hexylthiophene) diol.

The synthesis was carried out as illustrated in Scheme 2. HT-PHT (0.3 g, 0.04 mmol) was dissolved in anhydrous THF (80 ml). 2M t-butylMgCl in THF (5 ml) was then added. The mixture was warmed to 70° C. at stirred at that temperature for 2 hours. After cooling to room temperature, 2M HCl aqueous solution (5 ml) was added to neutralize the solution. After precipitated in methanol and purified by Soxhlet extraction, the polymer was dissolved in anhydrous toluene (80 ml) under nitrogen. N-methylformanilide (2 ml, 0.016 mol) and $POCl_3$(1.3ml, 0.014 mol) were then added. The reaction was carried out at 75° C. for 24 hours. The solution was cooled to room temperature, followed by adding saturated aqueous solution of sodium acetate. The solution was stirred for another 2 hours. The polymer was precipitated in methanol and purified by Soxhlet extraction with methanol. After drying in vacuum, the polymer was dissolved in anhydrous THF (80 ml) under nitrogen. $LiAlH_4$ solution in THF (1M 1.0 ml) was then added. The mixture was stirred at room temperature for 40minutes. HCl (1 M, 1 ml) was then added to quench the excess $LiAlH_4$. The polymer was precipitated in methanol and purified by Soxhlet extraction with methanol. After drying in vacuum, HT-PHT diol was obtained. Yield was recorded to be 93%. FIG. 3 is the MALDI MS of the product.

Example 4

This example illustrates the preparation and properties of HT-PHT-block-polystyrene diblock copolymers.

The preparation was performed as shown in Scheme 3. —OH functionalized HT-PHT (0.14 g, 0.018 mmol) was dissolved in anhydrous THF (40 ml) under nitrogen. To the solution triethylamine (3.0 ml, 0.022 mol) and 2-bromopropionyl bromide (2.5 ml, 0.02 mol) were added. The reaction was carried out at room temperature for about 12 hours. The polymer was precipitated in methanol and purified through dissolving in THF and precipitation again in methanol. After drying in vacuum, this macroinitiator (0.1 g, about 0.012 mmol) was dissolved in the mixture of styrene (7 ml) and toluene (7 ml). The styrene has been freshly distilled under vacuum to eliminate the inhibitor. The toluene was also freshly distilled. To this polymer solution CuBr (0.036 g, 0.25 mmol) and N,N,N'N'N"-pentamethyldiethylenetriamine (PMDTA) (0.043 g, 0.25 mmol) were added. The solution was then purged with nitrogen for 20 minutes and placed into an oil bath of 90° C. 5 ml of the solution was removed by syringe to precipitate the polymer in methanol.after 0.5 hours, 1.5 hours, 3.0 hours, and 4.5 hours respectively. The diblock copolymers were dissolved in THF and pass through the $Al_2O_3$ column to eliminate the catalyst. Pure copolymers were obtained after precipitation in methanol again. All four copolymers were a purple powder. The molecular weight of these copolymers have been measured by NMR and size exclusion chromatography equipped with an UV detector. Both tools have confirmed the success of the preparation of the block copolymers. The characterization results are listed in Table 2.

TABLE 2

Characterization Data of the Compositions, Molecular Weights, Molecular Weight Distributions and Electrical Conductivity of HT-PHT-Block-PS Diblock Copolymers

| Sample | n | M | Mn ($^1$HNMR) | Mn (SEC) | Mw/Mn | Conductivity (S/cm) |
|---|---|---|---|---|---|---|
| $(PHT_n\text{-b-}PS_m)$ 1 | 50 | 50 | 14,000 | 16,100 | 1.15 | 138 |
| $(PHT_n\text{-b-}PS_m)$ 2 | 51 | 136 | 22,900 | 30,200 | 1.31 | 4.7 |
| $(PHT_n\text{-b-}PS_m)$ 3 | 51 | 279 | 37,600 | 41,400 | 1.32 | 0.08 |
| $(PHT_n\text{-b-}PS_m)$ 4 | 51 | 425 | 52,900 | 53,400 | 1.45 | 0.14 |

The solid films of these diblock copolymers were prepared through casting from their solutions in toluene. Atomic Force Microscopy (AFM) was employed to characterize their morphology. All of them showed long "nanowire" network structures. FIG. 4 shows an example of these AFM images.

The electrical conductivities of these diblock copolymers were measured using the routine four-point probe method. The block copolymer solutions in toluene (5 mg/1 ml) were cast on glass slides. These solid films were then exposured to an iodine atmosphere for 10 hours. Thereafter, the four-point probe method was used to measure the resistance of the films. At least 6 times of repeating measurement were carried for a selected area. Each of the glass slides with polymer films was then dipped into liquid nitrogen and broken into two pieces at the selected area. Because the temperature was much lower than the $T_g$ of the copolymers, the breaking cross sections were clean and flat. Scanning Electron Microscopy (SEM) was then employed to measure the width of the cross sections of the selected areas. The conductivity (σ) was obtain with the following:

$$\sigma=1/p=1/(4.53*R*W)$$

in which R represents the resistance and W is the width of a solid film. The measurement results are listed in Table 2.

Example 5

This example illustrates the preparation and properties of HT-PHT-block-polymethylacrylate (PMA) diblock copolymers.

The synthesis is same as that described in Example 4 except that methyl acrylate monomer was used in the ATRP step. NMR and size exclusion chromatography also were used to characterize these diblock copolymers. The characterization results are listed in Table 3.

TABLE 3

Characterization Data of the Compositions, Molecular Weights, Molecular Weight Distributions and Electrical Conductivity of HT-PHT-Block-PMA Diblock Copolymers

| Sample | n | m | Mn ($^1$HNMR) | Mn (SEC) | Mw/Mn | Conductivity (S/cm) |
|---|---|---|---|---|---|---|
| ($PHT_n$-b-$PMA_m$) 1 | 42 | 25 | 9,300 | 16,100 | 1.15 | 116 |
| ($PHT_n$-b-$PMA_m$) 2 | 42 | 42 | 10,800 | 17,800 | 1.15 | 49 |
| ($PHT_n$-b-$PMA_m$) 3 | 42 | 117 | 17,300 | 23,900 | 1.19 | 7.1 |

Both AFM and TEM have confirmed the present of "nanowire" networks in the solid films of the diblock copolymers casted from their solution in toluene or xylene. FIG. 5 and FIG. 6 respectively show the AFM and TEM of a HT-PHT-block-PMA sample.

The conductivity measurement of these diblock copolymers were performed in the same way as described in Example 3. The result are also listed in Table 3.

Example 6

This example illustrates the preparation and properties of PS-block-HT-PHT-block-PS and PMA-block-HT-PHT-block-PMA triblock copolymers.

The preparation was carried out as illustrated in Scheme 4. A difuctional ATRP macroinitiator was synthesized. HT-PHT diol was dissolved in anhydrous THF under nitrogen. To this solution triethylamine and 2-bromopropionyl bromide were added. After the reaction was carried out at room temperature for about 12 hours, the polymer was precipitated in methanol. The polymer was purified through dissolving in THF and precipitation again in methanol. After drying in vacuum, the polymer was used as difunctional initiator to perform the ATRP polymerization of styrene and methyl acrylate. The ATRP procedure was the same as that described in Example 4.

The characterization results of these triblock copolymers are listed in Table 4.

TABLE 4

Characterization Data of the Compositions, Molecular Weights, Molecular Weight Distributions and Electrical Conductivity of Triblock Copolymers Containing Regioregular Head-to-Tail Polyhexylthiophene (PHT)

| Sample | n | m | Mn ($^1$HNMR) | Mn (SEC) | Mw/Mn | Conductivity (S/cm) |
|---|---|---|---|---|---|---|
| ($PS_{m/2}$-b-$PHT_n$-b-$PS_{m/2}$) 1 | 56 | 86 | 18,500 | 25,500 | 1.21 | 5.2 |
| ($PS_{m/2}$-b-$PHT_n$-b-$PS_{m/2}$) 2 | 56 | 251 | 35,600 | 38,100 | 1.25 | 0.43 |
| ($PS_{m/2}$-b-$PHT_n$-b-$PS_{m/2}$) 3 | 56 | 822 | 94,900 | 93,600 | 1.51 | 0.05 |
| ($PMA_{m/2}$-b-$PHT_n$-b-$PMA_{m/2}$) 1 | 56 | 122 | 20,100 | 29,700 | 1.29 | 3.3 |
| ($PMA_{m/2}$-b-$PHT_n$-b-$PMA_{m/2}$) 2 | 59 | 352 | 46,100 | 50,400 | 1.41 | 1.6 |
| ($PMA_{m/2}$-b-$PHT_n$-b-$PMA_{m/2}$) 3 | 56 | 625 | 74,500 | 72,300 | 1.66 | 0.076 |

Example 7

This example illustrates the preparation and properties of polyurethane containing HT-PHT.

Chemical incorporation of HT-PHT into polyurethane was performed as shown in Scheme 5. A two-shot process was used to carry out the synthesis. The stoichiometric amounts of HT-PHT diol prepared as described in Example 3 was dissolved in anhydrous THF in a flask equipped with a mechanical stirred, reflux condenser and a dropping funnel. A few drops of dibutyltin dilaurate were added as catalyst. At reflux temperature, tolyl diisocyanate (TDI) was added dropwise with constant stirring and the reaction was continued for 2 hours to ensure endcapping of the polyhexylthiophene-diol by the TDI. The required quantity of 1,4-butanediol and PEG in THF was then added over a period of half an hour. The reaction was continued for 3 hours and the excess THF was distilled off. The viscous polymer solution was then cast and cured at room temperature in dry atmosphere.

Three polyurethane samples with different percentages of HT-PHT were synthesized. The weight percentage of HT-PHT in these three samples are 10%, 6.4%, and 0.6% respectively. After doped with iodine, the four-point probe method was employed to measure the conductivities of these polyurethane films. The results are listed in Table 5.

TABLE 5

Conductivities of Polyurethane Samples Containing HT-PHT

| wt % of HT-PHT | 10% | 6.40% | 0.60% |
|---|---|---|---|
| Conductivity (s/cm) | 0.13 | 0.048 | $4.6 \times 10^{-6}$ |

Example 8

The following example is a procedure comparison for the polymerization of regioregular HT-PAT using $ZnCl_2$ (set forth in Example 1) versus $MgBr_2$.

An anhydrous diisopropylamine (1.4 ml, 10 mmol) and anhydrous THF (50 ml) were placed in a 100 ml flask. This mixture was cooled to a temperature of −76° C., and 4 ml of 2.5M Butyllithium was added. The solution was warmed to 0° C., stirred at that temperature for 5 minutes and cooled back to a temperature of −76° C. To this reaction mixture containing LDA was added $_2$-bromo-3hexylthiophene (2.47 g, 10 mmol) and the solution was stirred at −50° C. for 1 hour. This was followed by addition of anhydrous $MgBr_2.Et_2O$ (2.6 g, 10 mmol) at −60° C. and the reaction was stirred at that temperature for 1 hour. The reaction was then slowly allowed to warm up to 0° C., whereupon all $MgBr_2.Et_2O$ has reacted. To the above mixture 35 mg of $Ni(dppp)Cl_2$ was added and the mixture was stirred at room temperature for 1 hour. The polymer was then precipitated with methanol. After filtration, the polymer was purified by Soxhlet extraction with methanol, hexane, $CH_2Cl_2$ and finally THF. 0.32 g of polymer was obtained from the THF fraction after removing the THF (yield is 37%). MALDI analysis, H/Br: about 75%, H/H: about,20%, Br/Br: about 5%.

The regioregular polymers, and the methods of forming the same provide the diblock and triblock copolymers having excellent conductivity and low polydispersities that are useful in a number of commercially important applications. Examples include light emitting diodes (LEDs), polymer sensors, biosensors, field-effect transistors, flat panel displays, televisions, roll up displays, smart cards, phone cards, chemical sensory materials, and nonlinear optical materials. Moreover, phase separation of block copolymers can produce micro- or nanoscale sheets, cylinder or spheres that could be used to fabricate micro- or nanoscale electronic and optical devices, such as nanoscale transistors.

Although the foregoing description has necessarily presented a limited number of embodiments of the invention, those of ordinary skill in the relevant art will appreciate that various changes in the components, details, materials, and process parameters of the examples that have been herein described and illustrated in order to explain the nature of the invention may be made by those skilled in the art, and all such modifications will remain within the principle and scope of the invention as expressed herein in the appended claims. It will also be appreciated by those skilled in the art that changes could be made to the embodiments described above without departing from the broad inventive concept thereof. It is understood, therefore, that this invention is not limited to the particular embodiments disclosed, but it is intended to cover modifications that are within the principle and scope of the invention, as defined by the appended claims.

Therefore, we claim:

1. A polythiophene polymer, the polymer having the structure:

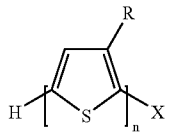

wherein R is a substituent selected from the group consisting of alkyl, polyether, and aryl, X is a halogen, and n is greater than 1, the polymer being formed from a polymerization reaction in major amounts of at least [90%] *about 75%* by weight.

2. The polythiophene polymer of claim 1, wherein R is an alkyl group.

3. The polythiophene polymer of claim 1, wherein R is an alkyl group having from 1 to 15 carbon atoms.

4. The polythiophene polymer of claim 1, wherein R is an alkyl group having from 4 to 15 carbon atoms.

5. The polythiophene polymer of claim 1, wherein R is an alkyl group having from 4 to 12 carbon atoms.

6. The polythiophene polymer of claim 1, wherein R is an alkyl group selected from the group consisting of butyl, hexyl, octyl, and dodecyl.

7. The polythiophene polymer of claim 1, wherein X is a halogen selected from the group consisting of Cl, Br, and I.

8. The polythiophene polymer of claim 1, wherein X is Br.

[9. The polythiophene polymer of claim 1, wherein the polymer is formed from the polymerization reaction in major amounts of at least 95% by weight.]

10. A method of forming a polymer, comprising:

combining a soluble thiophene monomer with an amide base and a divalent metal halide; and adding an effective amount of a Ni(II) catalyst to initiate a polymerization reaction to form at least [90%] *about 75%* by weight of the polymer having the structure

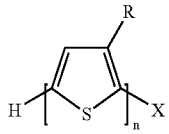

wherein R is a substituent selected from the group consisting of alkyl, polyether, and aryl, X is a halogen, and n is greater than 1.

11. The method of claim 10, wherein the amide base is lithium diisopropylamide.

12. The method of claim 11, wherein the lithium diisopropylamide and divalent metal halide are added to the thiophene monomer at a temperature ranging from −78° C. to −60° C.

13. The method of claim 10, wherein the divalent metal halide is zinc chloride.

14. The method of claim 10, wherein the Ni(II) [catalysts] *catalyst is* selected from the group consisting of 1,3-diphenylphosphinopropane nickel(II) chloride and 1,2-bis(diphenylphosphino)ethane nickel(II)chloride.

15. The method of claim 10, wherein R is an alkyl group.

16. The method of claim 10, wherein R is an alkyl group having 1 to 15 carbon atoms.

17. The method of claim 10, wherein R is an alkyl group having 4 to 15 carbon atoms.

18. The method of claim 10, wherein R is an alkyl group having 4 to 12 carbon atoms.

19. The method of claim 10, wherein R is an alkyl group selected from the group consisting of butyl, hexyl, octyl, and dodecyl.

20. The method of claim 10, wherein X is a halogen selected from the group consisting of Cl, Br, and I.

21. The method of claim 20, wherein X is Br.

22. The method of claim 10, further comprising quenching the reaction to form the polymer.

[23. The method of claim 10, wherein the polymer is formed from the polymerization reaction in major amounts of at least 95% by weight.]

24. A method of forming a polymer, comprising:

combining a soluble thiophene monomer with an amide base and zinc chloride at a temperature ranging from −78° C. to −60° C.; and adding an effective amount of a Ni(II) catalyst to initiate a polymerization reaction.

25. The method of claim 24, wherein the polymer has the structure:

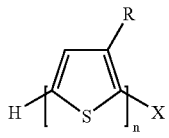

wherein R is a substituent selected from the group consisting of alkyl, polyether, and aryl, X is a halogen, and n is greater than 1.

26. The method of claim 25, wherein the polymer is at least [90%] *about 75%* by weight of a reaction product of the reaction.

27. The method of claim 25, wherein R is an alkyl group.

28. The method of claim 25, wherein R is an alkyl group having 1 to 15 carbon atoms.

29. The method of claim 25, wherein R is an alkyl group having 4 to 15 carbon atoms.

30. The method of claim 25, wherein R is an alkyl group having 4 to 12 carbon atoms.

31. The method of claim 25, wherein R is an alkyl group selected from the group consisting of butyl, hexyl, octyl, and dodecyl.

32. The method of claim 25, wherein X is a halogen selected from the group consisting of Cl, Br, and I.

33. The method of claim 32, wherein X is Br.

[34. The method of claim 24, wherein the polymer is formed from the polymerization reaction in major amounts of at least 95% by weight.]

35. The method of claim 24, wherein the amide base is lithium diisopropylamide.

36. The method of claim 24, wherein the Ni(II) catalyst is selected from the group consisting of 1,3-diphenylphosphinopropane nickel(II) chloride and 1,2-bis(diphneylphosphino)ethane nickel(II) chloride.

37. The method of claim 24, further comprising quenching the reaction to form the polymer.

38. A method of forming a polymer, comprising:

combining a soluble thiophenemonomer with an amide base and a divalent metal halide;

adding an effective amount of a first Ni(II) catalyst to initiate a polymerization reaction to form at least [90%] *about 75%* by weight of an intermediate polymer having the structure:

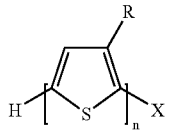

wherein R is a substituent selected from the group consisting of alkyl, polyether, and aryl, X is a halogen, and n is greater than 1;

adding a derivative compound represented by the formula PFG-A-MX' and a second Ni(II) catalyst to the intermediate polymer to form a protected thiophene polymer, wherein PFG is a protected hydroxyl or amine functional group, A is selected from the group consisting of alkyl and aromatic, M is a selected from the group consisting to Zn and Mg, and X' is a halogen; and deprotecting the protected thiophene polymer in an acid environment to form the deprotected polymer having one functional end group.

39. The method of claim 38, wherein the amide base is lithium diisopropylamide.

40. The method of claim 39, wherein the lithium diisopropylamide and divalent metal halide are added to the thiophene monomer at a temperature ranging from −78° C. to −60° C.

41. The method of claim 38, wherein the divalent metal halide is zinc chloride.

42. The method of claim 38, wherein the first and the second Ni(II) catalyst are selected from the group consisting of 1,3-diphenylphosphinopropane nickel(II) chloride and 1,2-bis(diphenylphosphino)ethane nickel(II) chloride.

43. The method of claim 38, wherein A is selected from the group consisting of benzene and thiophene, X' is selected from the group consisting of Br and Cl, and PFG is selected from the group consisting of —$CH_2CH_2O$(tetrahydropyran), —$CH_2CH_2O$(trimethylsilane), and

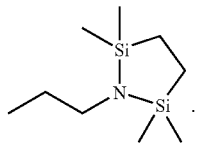

44. The method of claim 38, wherein deprotecting the protected thiophene polymer comprises adding acid agents with a refluxing solvent.

45. The method of claim 44, wherein the acid agents include hydrochloric acid, and the refluxing solvent is tetrahydrofuran.

46. A method of forming a polymer, comprising:

combining a soluble thiophene monomer with an amide base and zinc chloride at a temperature ranging from −78° C. to −60° C.;

adding an effective amount of a first Ni(II) catalyst to initiate a polymerization reaction and form an intermediate polymer;

adding a derivative compound represented by the formula PFG-A-MX' and a second Ni(II) catalyst to the intermediate polymer to form a protected thiophene polymer, wherein PFG is a protected hydroxyl or amine functional group, A is selected from the group consisting of alkyl and aromatic, M is a selected from the group consisting of Zn and Mg, and X' is a halogen; and deprotecting the protected thiophene polymer in an acid environment to form the deprotected polymer having one functional end group.

47. The method of claim [41]*46*, wherein the intermediate polymer has the structure:

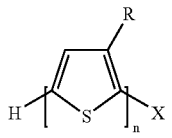

wherein R is a substituent selected from the group consisting of alkyl, polyether, and aryl, X is a halogen, and n is greater than 1.

48. The method of claim 46, wherein the amide base is lithium diisopropylamide.

49. The method of claim 46, wherein the first and the second Ni(II) catalyst are selected from the group consisting of 1,3diphenylphosphinopropane nickel(II) chloride and 1,2-bis(diphenylphosphino)ethane nickel(II) chloride.

50. The method of claim 46, wherein A is selected from the group consisting of benzene and thiophene, X' is selected from the group consisting of Br and Cl, and PFG is selected from the group consisting of —$CH_2CH_2O$(tetrahydropyran), —$CH_2CH_2O$(trimethylsilane), and

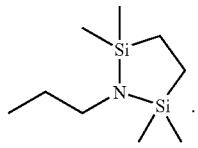

51. The method of claim 46, wherein deprotecting the protected thiophene polymer comprises adding acid agents with a refluxing solvent.

52. The method of claim 51, wherein the acid agents include hydrochloric acid, and the refluxing solvent is tetrahydrofuran.

53. A protected thiophene polymer having the structure:

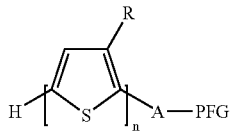

wherein PFG is a protected hydroxyl or amine functional group, and A is selected from the group consisting of alkyl and aromatic, the protected thiophene polymer formed from the polymer of claim 1.

54. The protected thiophene polymer of claim 53, wherein A is selected from the group consisting of benzene and thiophene, and PFG is selected from the group consisting of —$CH_2CH_2O$(tetrahydropyran), —$CH_2CH_2O$(trimethylsilane), and

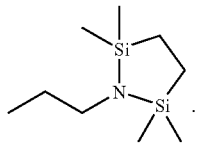

55. A deprotected polymer having one functional end group having the structure:

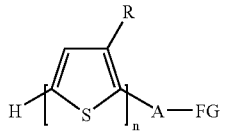

wherein R is selected from the group consisting of alkyl, polyester, and aryl; n is greater than 1; A is selected from the group consisting of alkyl and aromatic, and FG is a functional group selected from the group consisting of primary alkyl amine and primary alcohol, the deprotected polymer formed from the polymer of claim 1.

56. The deprotection polymer of claim 55, wherein A is selected from the group consisting of benzene and thiophene; and FG is a functional group selected from the group consisting of carboxylic acid, —$CH_2CH_2OH$, and —$CH_2CH_2CH_2NH_2$.

57. A method of forming a poly-(3-substituted) thiophene diol, comprising:

combining a soluble thiophene with an organomagnesium reagent, wherein the organomagnesium reagent has the formula R'MgX' and R' is a substituent selected from the group consisting of alkyl, vinyl and phenyl and X' is a halogen, to form at least 90% by weight of a polythiophene intermediate polymer having the structure:

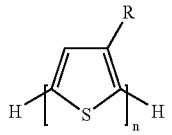

wherein R is a subsistent selected from the group consisting of alkyl, polyether, and aryl, and n is greater than 1;

introducing aldehyde groups to both ends of a chain of the intermediate polymer; and reducing the aldehyde groups to yield the poly-(3-substituted) thiophene diol.

58. The method of claim 57, further comprising adding an amount of tetrahydrofuran with the organomagnesium reagent.

59. The method of claim 57 wherein X' is a halogen selected from the group consisting of Br and I.

60. The method of claim 57, wherein R' is an alkyl group.

61. The method of claim 57, wherein the Ni(II) catalyst is one of 1,3-diphenylphosphinopropane nickel(II) chloride and 1,2-bis(diphenylphosphino)ethane nickel(II) chloride.

62. The method of claim 57, wherein R and R' are an alkyl group.

[63. The method of claim 57, wherein the polymer is formed from the polymerization reaction in major amounts of at least 95% by weight.]

[64. The method of claim 57, wherein the polymer is formed from the polymerization reaction in major amounts of at least 99% by weight.]

65. The method of claim 57, wherein essentially all of a product from the polymerization reaction is the thiophene diol.

66. The method of claim 57, wherein the introducing aldehyde groups of both ends of the chain of the intermediate polymer includes adding $POCl_3$ and N-methylformanilide to the intermediate polymer.

67. The method of claim 57, wherein reducing the aldehyde groups comprises adding $LiAlH_4$ to yield the poly-(3-substituted) thiophene diol.

68. A method of forming a diblock copolymer, comprising:

combining a soluble thiophene monomer with an amide base and zinc chloride at a temperature ranging from −78° C. to −60° C.;

adding an effective amount of a first Ni(II) catalyst to initiate a polymerization reaction and form an intermediate polymer;

adding a derivative compound represented by the formula PFG-A-MX' and a second Ni(II) catalyst to the intermediate polymer to form a protected thiophene polymer, wherein PFG is a protected hydroxyl or amine functional group, A is selected from the group consisting of alkyl and aromatic, M is a selected from the group consisting of Zn or Mg, and X is a halogen; and deprotecting the protected thiophene polymer in an acid environment to form a deprotected polymer having one functional end group;

adding an ATRP initiator and a base to the deprotected polymer to form a ATRP macroinitiator; and adding CuBr, at least one ATRP ligand, and at least one radically polymerizable monomer to the ATRP macroinitiator to form the diblock copolymer.

69. The method of claim 68, wherein the ATRP initiator 2-bromopropionyl bromide.

70. The method of claim 68, wherein the ATRP ligand is pentamethyldiethylenetriamine.

71. The method of claim 68, wherein the radically polymerizable monomer is selected from the group consisting of styrenes, substituted styrenes, and acrylates.

72. A method of forming a diblock copolymer, comprising:

providing a deprotected polymer having one functional end group having the structure:

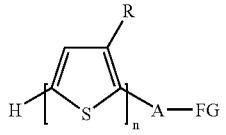

wherein R is selected from the group consisting of alkyl, polyether, and aryl; n is greater than 1; A is selected from the group consisting of alkyl and aromatic, and FG is a functional group selected from the group consisting of primary alkyl amine and primary alcohol;

adding an ATRP (atom-transfer-radical-polymerization) initiator and a base to the deprotected polymer to form an ATRP macroinitiator; and adding CuBr, at least one ATRP ligand, and at least one radially polymerizable monomer to the ATRP macroinitiator to form the diblock copolymer.

73. The method of claim 72, wherein the ATRP initiator 2-bromopropionyl bromide.

74. The method of claim 72, wherein the ATRP ligand is pentamethyldiethylenetriamine.

75. The method of claim 72, wherein the radically polymerizable monomer is selected from the group consisting of styrenes, substituted styrenes, and acrylates.

76. A method of forming a triblock copolymer, comprising combining a soluble thiophene with an organomagnesium reagent, wherein said organomagnesium reagent has the formula R'MgX' and R' is a substituent selected from the group consisting of alkyl, vinyl and phenyl and X' is a halogen, to form at least 90% by weight of a polythiophene intermediate polymer having the structure:

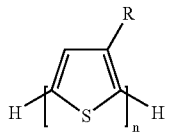

wherein R is a substituent selected from the group consisting of alkyl, polyether, and aryl, and n is greater than 1;

introducing aldehyde groups of both ends of a chain of the intermediate polymer;

reducing the aldehyde groups to yield a poly-(3-substituted) thiophene diol;

adding an ATRP (atom-transfer-radical-polymerization) initiator and a base to the diol to form a ATRP macroinitiator; and adding CuBr, at least one ATRP ligand, and at least one radically polymerizable monomer to the ATRP macroinitiator to form the triblock copolymer.

77. The method of claim 76, wherein the ATRP initiator 2-bromopropionyl bromide.

78. The method of claim 76, wherein the ATRP ligand is pentamethyldiethylenetriamine.

79. The method of claim 76, wherein the radically polymerizable monomer is selected from the group consisting of styrenes, substituted styrenes, and acrylates.

80. A method of forming a triblock copolymer, comprising, providing a poly-(3-substituted) thiophene diol having the structure:

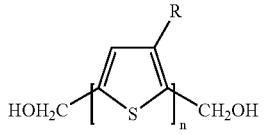

wherein R is a substituent selected from the group consisting of alkyl, polyether, and aryl, and n is greater than 1, adding an ATRP (atom-transfer-radical-polymerization) initiator and a base to the diol to form a ATRP macroinitiator; and adding CuBr, at least one ATRP ligand, and at least one radically polymerizable monomer to the ATRP macroinitiator to form the triblock copolymer.

81. The method of claim 80, wherein the ATRP initiator 2-bromopropionyl bromide.

82. The method of claim 80, wherein the ATRP ligand is pentamethyldiethylenetriamine.

83. The method of claim 80, wherein the radically polymerizable monomer is selected from the group consisting of styrenes, substituted styrenes, and acrylates.

84. A method of forming a polyurethane copolymer, comprising combining a soluble thiophene with an organomagnesium reagent, wherein said organomagnesium reagent has the formula R'MgX' and R' is a substitute selected from the group consisting of alkyl, vinyl and phenyl and X' is a halogen, to form at least 90% by weight of a polythiophene intermediate polymer having the structure:

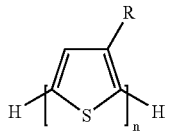

wherein R is a substituent selected from the group consisting of alkyl, polyether, and aryl, and n is greater than 1;

introducing aldehyde groups to both ends of a chain of the[.] intermediate polymer;

reducing the aldehyde groups to yield a poly-(3-substituted) thiophene diol;

adding at least one dihydroxyl functional compound and at least one polyisocyanate to the diol to form the polyurethane copolymer.

85. A method of forming a polyurethane copolymer, comprising, providing a poly-(3-substituted) thiophene diol having the structure:

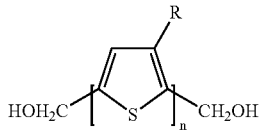

wherein R is a substituent selected from the group consisting of alkyl, polyether, and aryl, and n is greater than 1;

adding at least one dihydroxyl functional compound and at least one polyisocyanate to the diol to form the polyurethane copolymer.

86. An electrically conductive or optically sensitive polymeric material formed from the method of claim 68.

87. An electrically conductive or optically sensitive polymeric material formed from the method of claim 72.

88. An electrically conductive or optically sensitive polymeric material formed from the method of claim 76.

89. An electrically conductive or optically sensitive polymeric material formed from the method of claim 80.

90. An electrically conductive or optically sensitive polymeric material formed from the method of claim [89]*84*.

91. An electrically conductive or optically sensitive polymeric material formed from the method of claim 85.

* * * * *